United States Patent
Wang et al.

(10) Patent No.: US 10,872,583 B2
(45) Date of Patent: Dec. 22, 2020

(54) COLOR TEMPERATURE ADJUSTMENT METHOD AND APPARATUS, AND GRAPHICAL USER INTERFACE

(71) Applicant: Huawei Technologies Co., Ltd., Shenzhen (CN)

(72) Inventors: Shitong Wang, Shanghai (CN); Kuitao Zhu, Shanghai (CN); Hao Wu, Shanghai (CN); Yonglang Wang, Shanghai (CN); Miaofeng Wang, Shanghai (CN); Yan Yi, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/345,978

(22) PCT Filed: Oct. 31, 2016

(86) PCT No.: PCT/CN2016/104135
§ 371 (c)(1),
(2) Date: Apr. 29, 2019

(87) PCT Pub. No.: WO2018/076375
PCT Pub. Date: May 3, 2018

(65) Prior Publication Data
US 2019/0362688 A1  Nov. 28, 2019

(51) Int. Cl.
*G09G 5/02* (2006.01)
*G06F 3/0484* (2013.01)
(Continued)

(52) U.S. Cl.
CPC .......... *G09G 5/026* (2013.01); *G06F 3/0484* (2013.01); *G09G 5/04* (2013.01); *G09G 5/10* (2013.01);
(Continued)

(58) Field of Classification Search
CPC .......... G09G 5/026; G09G 5/04; G06F 3/0484
See application file for complete search history.

(56) References Cited

U.S. PATENT DOCUMENTS

| | | | |
|---|---|---|---|
| 4,677,289 A | 6/1987 | Nozaki et al. | |
| 5,965,875 A | 10/1999 | Merrill | |

(Continued)

FOREIGN PATENT DOCUMENTS

| | | |
|---|---|---|
| CN | 1241098 A | 1/2000 |
| CN | 1452769 A | 10/2003 |

(Continued)

OTHER PUBLICATIONS

Machine Translation and Abstract of Chinese Publication No. CN103294362, Sep. 11, 2013, 29 pages.

(Continued)

*Primary Examiner* — Sarah Lhymn
(74) *Attorney, Agent, or Firm* — Conley Rose, P.C.

(57) ABSTRACT

A method includes detecting an input operation performed on a display screen of a terminal when the display screen is touched and when a color temperature adjustment region is displayed on the display screen, converting, in response to the input operation, coordinates of an operation point corresponding to the input operation into a first color parameter, obtaining ambient light converting a color parameter of the ambient light into a second color parameter, integrating the first color parameter and the second color parameter to obtain a third color parameter, converting the third color parameter into a target color parameter, and displaying the target color parameter on the display screen of the terminal.

21 Claims, 13 Drawing Sheets

(51) Int. Cl.
G09G 5/04 (2006.01)
G09G 5/10 (2006.01)

(52) U.S. Cl.
CPC ............... *G09G 2320/0666* (2013.01); *G09G 2360/144* (2013.01)

(56) References Cited

U.S. PATENT DOCUMENTS

| | | | |
|---|---|---|---|
| 6,198,147 | B1 | 3/2001 | Connolly |
| 6,292,228 | B1 | 9/2001 | Cho |
| 7,027,067 | B1* | 4/2006 | Ohga .................. H04N 1/6058 345/589 |
| 7,283,139 | B1 | 10/2007 | Tanaka |
| 7,751,085 | B2* | 7/2010 | Yabe ..................... H04N 1/603 358/1.9 |
| 8,659,698 | B2 | 2/2014 | Blayvas et al. |
| 2003/0076336 | A1* | 4/2003 | Fukao ..................... G09G 5/02 345/589 |
| 2004/0125222 | A1 | 7/2004 | Bradski et al. |
| 2005/0078122 | A1* | 4/2005 | Ohga .................. H04N 1/6058 345/589 |
| 2005/0083354 | A1 | 4/2005 | Oh |
| 2007/0070468 | A1* | 3/2007 | Ogawa ................ H04N 1/6075 358/518 |
| 2009/0067711 | A1* | 3/2009 | Sasaki ..................... H04N 9/73 382/167 |
| 2009/0237423 | A1 | 9/2009 | Shih et al. |
| 2010/0026192 | A1 | 2/2010 | Hadwen et al. |
| 2014/0104253 | A1* | 4/2014 | Koyanagi ............ G09G 3/2003 345/207 |
| 2014/0258895 | A1* | 9/2014 | Zhang .................. G06F 3/0484 715/762 |
| 2014/0351728 | A1 | 11/2014 | Seo et al. |
| 2014/0375669 | A1* | 12/2014 | Zhang ..................... G09G 5/02 345/589 |
| 2015/0062347 | A1 | 3/2015 | Jin |
| 2015/0205505 | A1* | 7/2015 | Conn .................... G06F 1/1626 715/765 |
| 2016/0140889 | A1* | 5/2016 | Wu ....................... G09G 3/2003 345/207 |
| 2017/0132811 | A1 | 5/2017 | Yamaki |
| 2017/0229059 | A1* | 8/2017 | Bonnier .................. G06F 3/017 |
| 2017/0251142 | A1* | 8/2017 | Watanabe ............ G06F 3/04883 |
| 2017/0323460 | A1* | 11/2017 | Carney .................. H04N 9/045 |

FOREIGN PATENT DOCUMENTS

| | | |
|---|---|---|
| CN | 1609944 A | 4/2005 |
| CN | 102479499 A | 5/2012 |
| CN | 102682738 A | 9/2012 |
| CN | 203136282 U | 8/2013 |
| CN | 103294362 A | 9/2013 |
| CN | 103514828 A | 1/2014 |
| CN | 104157261 A | 11/2014 |
| CN | 104428829 A | 3/2015 |
| CN | 104461289 A | 3/2015 |
| CN | 104599658 A | 5/2015 |
| CN | 105261346 A | 1/2016 |
| CN | 105282334 A | 1/2016 |
| CN | 105895050 A | 8/2016 |
| CN | 105912231 A | 8/2016 |
| EP | 2809055 A2 | 12/2014 |
| JP | 2006049437 A | 2/2006 |
| KR | 20070000131 A | 1/2007 |
| KR | 100723457 B1 | 5/2007 |
| WO | 2014204111 A1 | 12/2014 |
| WO | 2016021285 A1 | 2/2016 |

OTHER PUBLICATIONS

Machine Translation and Abstract of Chinese Publication No. CN203136282, Aug. 14, 2013, 8 pages.
Machine Translation and Abstract of Chinese Publication No. CN104461289, Mar. 25, 2015, 17 pages.
"Phone color tone can be adjusted, you can choose the warm and cold color temperature," Retrieved from: https://club.nuawei.com/thread-10213750-1-1.html, Jul. 4, 2016, 4 pages.
"156 color temperature adjustment, how to adjust LG," Retrieved from: https://club.huawei.com/thread-8025804-1-1.html, Feb. 3, 2016, 4 pages.
Foreign Communication From A Counterpart Application, Chinese Application No. 201680036134.6, Chinese Office Action dated Dec. 2, 2019, 7 pages.
Foreign Communication From A Counterpart Application, Chinese Application No. 201810910252.6, Chinese Office Action dated Dec. 9, 2019, 20 pages.
Machine Translation and Abstract of Chinese Publication No. CN104157261, Nov. 19, 2014, 13 pages.
Machine Translation and Abstract of Chinese Publication No. CN102479499, May 30, 2012, 10 pages.
Machine Translation and Abstract of Chinese Publication No. CN102682738, Sep. 19, 2012, 13 pages.
Machine Translation and Abstract of Chinese Publication No. CN103514828, Jan. 15, 2014, 10 pages.
Machine Translation and Abstract of Chinese Publication No. CN105895050, Aug. 24, 2016, 20 pages.
"Premiere color correction and adjustment," Apr. 2, 2016, 38 pages, with 27 pages English translation.
Foreign Communication From A Counterpart Application, Chinese Application No. 201810910252.6, Chinese Office Action dated Sep. 9, 2019, 11 pages.
Langfelder, G. et al.; "A Device and an Algorithm for the Separation of Visible and Near Infrared Signals in a Monolithic Silicon Sensor"; Feb. 3, 2011; 9 pages.
Swaminathan, et al; "Optically-aligned Visible/near-infrared Dual-band Photodetector Materials and Devices on GaAs Using Metamorphic Epitaxy" Sep. 23, 2011; 9 pages.
Machine Translation and Abstract of Chinese Publication No. CN104599658, May 6, 2015, 17 pages.
Machine Translation and Abstract of Chinese Publication No. CN105261346, Jan. 20, 2016, 25 pages.
Machine Translation and Abstract of Chinese Publication No. CN105282334, Jan. 27, 2016, 10 pages.
Machine Translation and Abstract of Chinese Publication No. CN105912231, Aug. 31, 2016, 22 pages.
Foreign Communication From A Counterpart Application, PCT Application No. PCT/CN2016/104135, English Translation of International Search Report dated Jul. 27, 2017, 3 pages.
Foreign Communication From A Counterpart Application, PCT Application No. PCT/CN2016/104135, English Translation of Written Opinion dated Jul. 27, 2017, 5 pages.

* cited by examiner

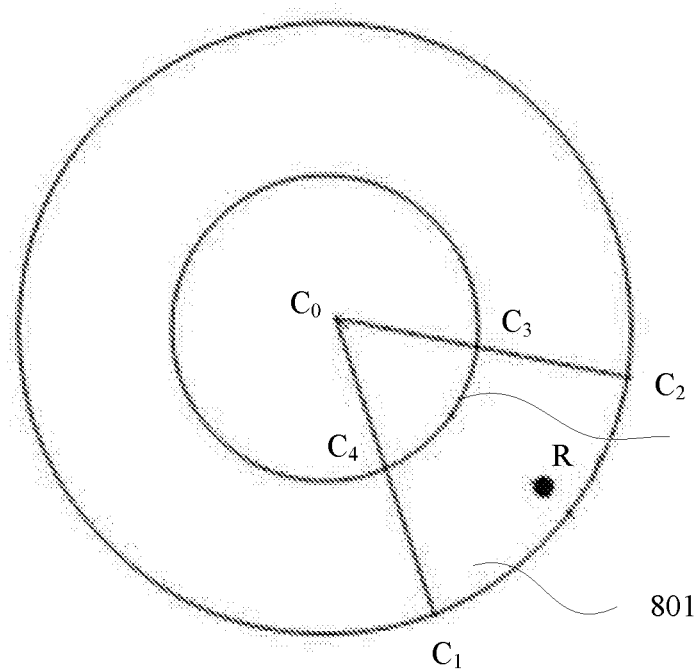

FIG. 8b

| Determine, based on a relationship between coordinates of a touch point generated during an input operation and a color temperature adjustment region, polar coordinates of the input operation that are in the color temperature adjustment region | S1021 |

↓

| Determine, based on a location that is of the polar coordinates of the input operation and that is in the color temperature adjustment region, N control points corresponding to the input operation | S1022 |

↓

| Convert the polar coordinates of the input operation into a first color parameter based on RGB parameters of the N control points corresponding to the input operation and by using a gain interpolation algorithm | S1023 |

FIG. 9

COLOR TEMPERATURE ADJUSTMENT METHOD AND APPARATUS, AND GRAPHICAL USER INTERFACE

CROSS-REFERENCE TO RELATED APPLICATIONS

This application is a U.S. National Stage of International Patent Application No. PCT/CN2016/104135 filed on Oct. 31, 2016, which is hereby incorporated by reference in its entirety.

TECHNICAL FIELD

Embodiments of the present invention relate to the terminal field, and in particular, to a color temperature adjustment method and apparatus, and a graphical user interface.

BACKGROUND

A color temperature (colo(u)r temperature) is a counter indicating spectrum quality of a light source. Various color components in different light sources (for example, daylight, a fluorescent lamp, and an incandescent lamp) have different ratios. Therefore, ratios of various color components in a display screen of a terminal (for example, a mobile phone or a tablet computer) need to be adjusted based on a characteristic of the light source. The ratios of the various color components in the display screen are usually represented by a color temperature value. A lower color temperature value indicates a redder display screen. A higher color temperature value indicates a bluer display screen. Therefore, a color temperature can be adjusted by adjusting the various color components in the display screen. Because a human visual system has a color adaptation function and a user have different feelings at different color temperatures of the display screen, for example, a warm feeling and a cold feeling, in different ambient conditions (different time, areas, and ambient light), the user has different color temperature requirements on the display screen. Therefore, the terminal needs to have a function of performing color temperature adaptive adjustment based on the ambient condition.

In the prior art, the color temperature of the terminal is usually adjusted in the following manner: As shown in FIG. 1, a UI (User Interface, user interface) of the terminal displays a single progress bar for adjusting the color temperature, a movable control is provided on the single progress bar, and the terminal detects that the movable control moves on the single progress bar, and adjusts the color temperature of the display screen to obtain a color temperature value at an end location on the movable control on the single progress bar. Alternatively, as shown in FIG. 2, a UI layer of the terminal displays three progress bars for adjusting an RGB parameter of the display screen, a movable control is provided on each progress bar, and the terminal detects that the movable control moves on each progress bar, and then adjusts the color temperature of the display screen to obtain a color component at an end location on the movable control on each progress bar.

However, in the color temperature adjustment solution shown in FIG. 1, the terminal can adjust the color temperature of the display screen only at two dimensions: approaching yellow and approaching blue. In the adjustment solution shown in FIG. 2, because each color component value in the RGB parameter needs to be adjusted to adjust the color temperature of the terminal, the user needs to have professional knowledge in the color field. Otherwise, the user has difficulty in adjusting the color temperature of the display screen to obtain a favored color value. In addition, in the adjustment solutions shown in FIG. 1 and FIG. 2, when the terminal adjusts the color temperature, an adjustment range on each progress bar is limited, and consequently the terminal has difficulty in adjusting the color temperature of the display screen by using the foregoing adjustment method, to obtain a target color temperature that matches an ambient condition.

SUMMARY

Embodiments of the present invention provide a color temperature adjustment method and apparatus, and a graphical user interface, to resolve the following prior-art problem: Because a color temperature adjustment range of a terminal is limited, it is difficult to adjust a color temperature of a display screen to obtain a target color temperature that matches an ambient condition.

To resolve the foregoing problem, technical solutions used in the embodiments of the present invention are as follows:

According to a first aspect, an embodiment of the present invention provides a color temperature adjustment method, where the method is applied to a terminal, there is a color temperature adjustment region on a display screen of the terminal, each operation point in the color temperature adjustment region is used to display one color, different operation points are used to display different colors, and the method includes: when the color temperature adjustment region is displayed on the display screen, detecting an input operation that is performed on the display screen when the display screen is touched, where a touch point generated during the input operation is corresponding to one operation point in the color temperature adjustment region; in response to the detected input operation, converting coordinates of the operation point corresponding to the input operation into a first color parameter; obtaining ambient light by using an ambient light sensor; converting a color parameter of the ambient light into a second color parameter; integrating the first color parameter and the second color parameter to obtain a third color parameter; converting the third color parameter into a target color parameter; and displaying the target color parameter on the display screen of the terminal.

In the color temperature adjustment method provided in this embodiment of the present invention, an intuitive color temperature adjustment region with a broad adjustable range is first provided for a user in a display interface of the terminal in this embodiment of the present invention, so that the terminal can collect an input operation in which the user performs color temperature adjustment on the display screen based on a color preference. Display screens of different vendors have different color temperatures, and different batches of display screens provided by a same vendor also usually have different color temperatures. Therefore, in this embodiment of the present invention, the first color parameter is obtained based on the input operation collected by the terminal, and the first color parameter and the second color parameter of the ambient light are integrated. In this way, in different ambient light conditions, the terminal can effectively compensate for a color temperature difference of the display screen based on the input operation and the ambient light, so that a finally adjusted color temperature of the display screen does not show a difference, and the color temperature of the display screen of the terminal matches a chromatic adaptation characteristic of human vision in different ambient light conditions. In addition to this, digital visual fatigue is reduced and sleep is improved.

With reference to the first aspect, in a first possible implementation of the first aspect, an adjustment control is provided in the color temperature adjustment region, where the adjustment control is used to indicate a color selected, during the input operation, in the color temperature adjustment region, and a location of the adjustment control varies, in the color temperature adjustment region, with the input operation. In this embodiment of the present invention, the adjustment control that can move, in the color temperature adjustment region, with the input operation is provided, so that a color selected by the user in the color temperature adjustment region can be intuitively displayed on the display screen of the terminal.

With reference to the first aspect or the first possible implementation of the first aspect, in a second possible implementation of the first aspect, the converting, by the terminal, the third color parameter into a target color parameter includes: if each component value in the third color parameter does not match RGB channels of the terminal that are corresponding to each component value, converting each component value in the third color parameter into a target component value corresponding to the component value; and determining the target component value corresponding to each component value as the target color parameter. Because each component value in the third color parameter falls within [0, 1] and the RGB channels of hardware of the terminal may or may not support [0, 1], in this embodiment of the present invention, each component value in the third color parameter is converted into a target component value that matches a channel in the RGB channels that is corresponding to the component value, so that the color temperature of the terminal can be properly adjusted.

With reference to any one of the first aspect, or the first to the second possible implementations of the first aspect, in a third possible implementation of the first aspect, the converting, by the terminal, the ambient light into a second color parameter includes: obtaining component values that are corresponding to the color parameter of the ambient light and that are in XYZ color space; determining a first component value and a second component value of the display screen in the XYZ color space based on current luminance of the display screen and the component values that are corresponding to the color parameter of the ambient light and that are in the XYZ color space; determining, based on the first component value, the current luminance of the display screen, and the second component value, each component value corresponding to the display screen in RGB color space; and performing normalization processing on each component value corresponding to the display screen in the RGB color space, to obtain the second color parameter.

With reference to any one of the first aspect, or the first to the third possible implementations of the first aspect, in a fourth possible implementation of the first aspect, the determining, based on the first component value, the current luminance of the display screen, and the second component value, each component value corresponding to the display screen in RGB color space includes: determining the first component value of the display screen in the XYZ color space according to a formula $$X_{sc} = \frac{X_{am}}{Y_{am}} Y_{sc},$$

where $X_{sc}$ represents the first component value of the display screen in the XYZ color space, $X_{am}$ represents an X component value that is corresponding to the RGB parameter of the ambient light and that is in the XYZ color space, $Y_{am}$ represents a Y component value that is corresponding to the RGB parameter of the ambient light and that is in the XYZ color space, and $Y_{sc}$ represents the current luminance of the display screen; and determining the second component value of the display screen in the XYZ color space according to a formula $$Z_{sc} = \frac{Z_{am}}{Y_{am}} Y_{sc},$$

where $Z_{sc}$ represents a Z component value of the display screen in the XYZ color space, and $Z_{am}$ represents a Z component value that is corresponding to the RGB parameter of the ambient light and that is in the XYZ color space. Color ratios of the RGB channels of the display screen need to be the same as color ratios of RGB channels in the ambient light, so that the user finds no difference when the color temperature of the display screen of the terminal is adjusted; and in addition, the XYZ space is color space defined based on a human visual characteristic. Therefore, after the color parameter of the ambient light is converted into that in the XYZ color space, the ambient light more meets the human visual characteristic.

With reference to any one of the first aspect, or the first to the fourth possible implementations of the first aspect, in a fifth possible implementation of the first aspect, before the determining a first component value and a second component value of the display screen in the XYZ color space based on current luminance of the display screen and the component values that are corresponding to the color parameter of the ambient light and that are in the XYZ color space, the method provided in this embodiment of the present invention further includes: obtaining a current luminance level of the display screen; and converting the current luminance level into the current luminance of the display screen based on a maximum luminance level of the display screen of the terminal and maximum luminance of the display screen.

With reference to any one of the first aspect, or the first to the fifth possible implementations of the first aspect, in a sixth possible implementation of the first aspect, before the performing, by the terminal, normalization processing on each component value corresponding to the display screen, to obtain the second color parameter, the method provided in this embodiment of the present invention further includes: calibrating, based on each component value corresponding to the display screen in the RGB color space and a preset adjustment factor of the component value, each component value corresponding to the display screen in the RGB color space, to obtain a calibrated component value of each component value corresponding to the display screen in the RGB color space. In this embodiment of the present invention, the preset adjustment factor corresponding to each component value is obtained by using ambient information, and each component value is calibrated based on the preset adjustment factor, so that accuracy of each component value corresponding to the display screen in the RGB color space can be improved.

With reference to any one of the first aspect, or the first to the sixth possible implementations of the first aspect, in a seventh possible implementation of the first aspect, before the calibrating, based on each component value corresponding to the display screen in the RGB color space and a preset adjustment factor of the component value, each component value corresponding to the display screen in the RGB color space, the method further includes: determining, from a preset lookup table and based on ambient information and the Y component value that is of the RGB parameter of the ambient light and that is in the XYZ color space, the preset adjustment factor of each component value corresponding to the display screen in the RGB color space, where the preset lookup table includes a correspondence between the Y component value and each component value corresponding to the display screen in the RGB color space, and the ambient information includes weather condition information, sunrise time information, and sunset time information. In this embodiment of the present invention, the preset adjustment factor of each component value corresponding to the display screen in the RGB color space is determined based on the ambient information, so that after the ambient information is used, a finally calibrated value of each component value corresponding to the display screen in the RGB color space can be more accurate. Therefore, accuracy of the color temperature adjustment method provided in this embodiment of the present invention is improved, and a finally adjusted color temperature can be more approximate to a target color temperature.

With reference to any one of the first aspect, or the first to the seventh possible implementations of the first aspect, in an eighth possible implementation of the first aspect, the performing normalization processing on each component value corresponding to the display screen, to obtain the second color parameter includes: obtaining a maximum component value from the component values corresponding to the display screen in the RGB color space; determining, as a normalized component value of each component value corresponding to the display screen in the RGB color space, a result obtained by dividing each component value corresponding to the display screen in the RGB color space by the maximum component value; and determining, as the second color parameter, the normalized component value of each component value corresponding to the display screen in the RGB color space. In this embodiment of the present invention, normalization processing is performed on each component value corresponding to the display screen in the RGB color space, so that each component value corresponding to the display screen in the RGB color space falls within [0, 1], and subsequent calculation efficiency is improved.

With reference to any one of the first aspect, or the first to the eighth possible implementations of the first aspect, in a ninth possible implementation of the first aspect, at least one control point is provided in the color temperature adjustment region, and one control point is corresponding to one RGB parameter; and converting coordinates of the input operation into the first color parameter includes: determining, based on a relationship between coordinates of the touch point generated during the input operation and the color temperature adjustment region, polar coordinates of the input operation that are in the color temperature adjustment region; determining, based on a location that is of the polar coordinates of the input operation and that is in the color temperature adjustment region, N control points corresponding to the input operation; and converting the polar coordinates of the input operation into the first color parameter based on RGB parameters of the N control points corresponding to the input operation and by using a gain interpolation algorithm.

With reference to any one of the first aspect, or the first to the ninth possible implementations of the first aspect, in a tenth possible implementation of the first aspect, the converting the polar coordinates of the input operation into the first color parameter based on RGB parameters of the N control points corresponding to the input operation and by using a gain interpolation algorithm includes: when the polar coordinates of the input operation are the same as polar coordinates of any control point in the color temperature adjustment region, determining, by the terminal as the first color parameter, an RGB parameter of the control point that has same polar coordinates as the input operation.

With reference to any one of the first aspect, or the first to the tenth possible implementations of the first aspect, in an eleventh possible implementation of the first aspect, when $N \geq 2$, a closed region enclosed by a closed curve including the N control points includes the polar coordinates of the input operation; and the converting the polar coordinates of the input operation into the first color parameter based on RGB parameters of the N control points corresponding to the input operation and by using a gain interpolation algorithm includes: when the polar coordinates of the input operation are different from polar coordinates of any one of the N control points, obtaining a component value that is corresponding to at least one first intersection point and that is in target color space, where the first intersection point is a point at which the closed curve including the N control points is intersected with a line connecting a center of the color temperature adjustment region and the operation point that is of the input operation and that is in the color temperature adjustment region; determining, based on the component value that is corresponding to the at least one first intersection point and that is in the target color space, a component value that is corresponding to the polar coordinates of the input operation and that is in the target color space; converting, in the RGB space, the component value that is corresponding to the polar coordinates of the input operation and that is in the target color space, to obtain a component value that is of the polar coordinates of the input operation and that is in the RGB space; and determining, as the first RGB adjustment parameter, the component value that is of the polar coordinates of the input operation and that is in the RGB space.

With reference to any one of the first aspect, or the first to the eleventh possible implementations of the first aspect, in a twelfth possible implementation of the first aspect, the determining, based on a relationship between coordinates of the touch point generated during the input operation and the color temperature adjustment region, polar coordinates of the input operation that are in the color temperature adjustment region includes: when determining that the touch point generated during the input operation is in the color temperature adjustment region, converting, into polar coordinates, the coordinates corresponding to the touch point generated during the input operation; or when determining that the touch point generated during the input operation is outside the color temperature adjustment region, obtaining a target operation point that is of the input operation and that is in the color temperature adjustment region, where the target operation point is an operation point that is in the color temperature adjustment region and that is closest to the touch point; converting coordinates of the target operation point into polar coordinates; and determining the polar coordinates of the target operation point as the polar coordinates of the input operation that are in the color temperature adjustment region. In this embodiment of the present invention, in the solution, an operation point corresponding to a touch point generated at any location on the display screen can be found in the color temperature adjustment region, so that the color temperature of the terminal is adjusted by using not merely an operation point in the color temperature adjustment region, and a color temperature adjustment range of the terminal is increased.

With reference to any one of the first aspect, or the first to the twelfth possible implementations of the first aspect, in a thirteenth possible implementation of the first aspect, the obtaining a component value that is corresponding to at least one first intersection point and that is in target color space includes: obtaining, according to a formula $$Y = [C_1, \ldots, C_N] \begin{bmatrix} \dfrac{\varphi_2}{\varphi_1 + \varphi_2} \\ \dfrac{\varphi_1}{\varphi_1 + \varphi_2} \end{bmatrix},$$

a component value that is corresponding to a first-first intersection point and that is in the target color space, where Y represents the component value that is corresponding to the first-first intersection point and that is in the target color space, $C_1$ represents a component value that is corresponding to a first control point and that is in the target color space, where the first control point is in the color temperature adjustment region and is corresponding to the first-first intersection point, $C_N$ represents a component value that is corresponding to an $N^{th}$ control point and that is in the target color space, where the $N^{th}$ control point is in the color temperature adjustment region and is corresponding to the first-first intersection point, $\Phi_1$ represents polar coordinates of an included angle formed by the first-first intersection point, a center of the color temperature adjustment region, and the first control point corresponding to the first-first intersection point, $\varphi_2$ separately represents polar coordinates of an included angle formed by the first-first intersection point, the center of the color temperature adjustment region, and a second control point corresponding to the first intersection point, and the first control point and the second control point are separately end points in a sub-region to which the first-first intersection point belongs.

With reference to any one of the first aspect, or the first to the thirteenth possible implementations of the first aspect, in a fourteenth possible implementation of the first aspect, the determining, based on the component value that is corresponding to the at least one first intersection point and that is in the target color space, a component value that is corresponding to the polar coordinates of the input operation and that is in the target color space includes: determining, by using a formula $$R = [S_1, T_1] \begin{bmatrix} \dfrac{u}{u+v} \\ \dfrac{v}{u+v} \end{bmatrix},$$

the component value that is corresponding to the polar coordinates of the input operation and that is in the target color space, where u=rho$_T$−rho, v=rho−rho$_S$, $T_1$ represents a component value that is corresponding to a first intersection point T and that is in the target color space, $S_1$ represents a component value that is corresponding to a first intersection point S and that is in the target color space, rho$_T$ represents a radius of polar coordinates of the first intersection point T, rho represents a radius of the polar coordinates of the input operation, and rho$_S$ represents a radius of polar coordinates of the first intersection point S.

With reference to any one of the first aspect, or the first to the fourteenth possible implementations of the first aspect, in a fifteenth possible implementation of the first aspect, the integrating the first color parameter and the second color parameter to obtain a third color parameter includes: integrating the first color parameter and the second color parameter according to a formula $$\begin{cases} r_3 = (\rho_1 r_2 + 1 - \rho_1)(\rho_2 r_1 + 1 - \rho_2) \\ g_3 = (\rho_1 g_2 + 1 - \rho_1)(\rho_2 g_1 + 1 - \rho_2), \\ b_3 = (\rho_1 b_2 + 1 - \rho_1)(\rho_2 b_1 + 1 - \rho_2) \end{cases}$$

to determine the third color parameter, where $\rho_1$ represents a first integration factor, $\rho_2$ represents a second integration factor, $r_3$ represents an R color component value in the third color parameter, $g_3$ represents a G color component value in the third color parameter, $b_3$ represents a B color component value in the third color parameter, $r_1$ represents an R color component value in the first color parameter, $g_1$ represents a G color component value in the first color parameter, $b_1$ represents a B color component in the first color parameter, $r_2$ represents an R color component value in the second color parameter, $g_2$ represents a G color component value in the second color parameter, and $b_2$ represents a B color component value in the second color parameter. The first color parameter and the second color parameter are integrated by using the formula, so that the color temperature of the terminal can be adjusted by combining the operation point determined during the input operation and the ambient light, and accuracy of color temperature adjustment is improved.

According to a second aspect, an embodiment of the present invention provides a terminal, where the terminal includes a display screen, an ambient light sensor, one or more processors, a memory, and one or more programs; the display screen is configured to: display a color temperature adjustment region, collect an input operation of a user, and send the input operation to the processor; the ambient light sensor is configured to: obtain ambient light of the terminal, and send the ambient light to the one or more processors; and the one or more programs are stored in the memory and are configured for execution by the one or more processors, and the one or more processors read the one or more programs stored in the memory, to execute the color temperature adjustment method according to any one of the first aspect, or the first to the fifteenth possible implementations of the first aspect.

According to a third aspect, an embodiment of the present invention provides a graphical user interface on a terminal that has a touchscreen, where the terminal includes a display screen, an ambient light sensor, a memory, and one or more processors configured to execute one or more programs stored in the memory, and the graphical user interface includes a display interface and a color temperature adjustment region; in response to detected triggering performed by a user on the touchscreen of the terminal, the display interface is displayed; and in response to detected triggering performed by the user on a to-be-selected option in the display interface by touching the touchscreen, the color temperature adjustment region is displayed, where each operation point in the color temperature adjustment region is used to display one color, and different operation points are used to display different colors.

With reference to the third aspect, in a first possible implementation of the third aspect, the graphical user interface further includes an adjustment control; and in response to a detected touch operation performed by the user on the touchscreen, the adjustment control is displayed, where the adjustment control is used to: indicate a location of an operation point that is of the touch operation and that is in the color temperature adjustment region, when the touchscreen is triggered.

With reference to the third aspect or the first possible implementation of the third aspect, in a second possible implementation of the third aspect, when the touch operation is in the color temperature adjustment region, the adjustment control is displayed at coordinates of a touch point generated during the touch operation; or when the touch operation is outside the color temperature adjustment region, the adjustment control is displayed at coordinates of a target operation point in the color temperature adjustment region, where the target operation point is an operation point that is in the color temperature adjustment region and that is closest to the touch point.

According to a fourth aspect, an embodiment of the present invention provides a color temperature adjustment apparatus, where the color temperature adjustment apparatus is applied to a terminal, there is a color temperature adjustment region on a display screen of the terminal, each operation point in the color temperature adjustment region is used to display one color, different operation points are used to display different colors, and the apparatus includes: a detection unit, configured to: when the color temperature adjustment region is displayed on the display screen, detect an input operation that is performed on the display screen when the display screen is touched, where a touch point generated during the input operation is corresponding to one operation point in the color temperature adjustment region; a response unit, configured to: in response to the detected input operation, convert coordinates of the operation point corresponding to the input operation into a first color parameter; an obtaining unit, configured to obtain ambient light by using an ambient light sensor; a first conversion unit, configured to convert the ambient light into a second color parameter; a processing unit, configured to integrate the first color parameter and the second color parameter to obtain a third color parameter; a second conversion unit, configured to convert the third color parameter into a target color parameter; and a display unit, configured to display the target color parameter on the display screen of the terminal.

With reference to the fourth aspect, in a first possible implementation of the fourth aspect, an adjustment control is provided in the color temperature adjustment region, where the adjustment control is used to indicate a color selected, during the input operation, in the color temperature adjustment region, and a location of the adjustment control varies, in the color temperature adjustment region, with the input operation.

With reference to the fourth aspect or the first possible implementation of the fourth aspect, in a second possible implementation of the fourth aspect, the second conversion unit is specifically configured to: if each component value in the third color parameter does not match RGB channels of the terminal that are corresponding to each component value, convert each component value in the third color parameter into a target component value corresponding to the component value; and determine the target component value corresponding to each component value as the target color parameter.

With reference to any one of the fourth aspect, or the first to the second possible implementations of the fourth aspect, in a third possible implementation of the fourth aspect, the first conversion unit includes: a first obtaining module, configured to obtain component values that are corresponding to the RGB parameter of the ambient light and that are in XYZ color space; a first determining module, configured to determine a first component value and a second component value of the display screen in the XYZ color space based on current luminance of the display screen and the component values that are corresponding to the RGB parameter of the ambient light and that are in the XYZ color space; a second determining module, configured to determine, based on the first component value, the current luminance of the display screen, and the second component value, each component value corresponding to the display screen in RGB color space; and a second obtaining module, configured to perform normalization processing on each component value corresponding to the display screen in the RGB color space, to obtain the second color parameter.

With reference to any one of the fourth aspect, or the first to the third possible implementations of the fourth aspect, in a fourth possible implementation of the fourth aspect, the second determining module is specifically configured to: determine the first component value of the display screen in the XYZ color space according to a formula $$X_{sc} = \frac{X_{am}}{Y_{am}} Y_{sc},$$

where $X_{sc}$ represents the first component value of the display screen in the XYZ color space, $X_{am}$ represents an X component value that is corresponding to the color parameter of the ambient light and that is in the XYZ color space, $Y_{am}$ represents a Y component value that is corresponding to the color parameter of the ambient light and that is in the XYZ color space, and $Y_{sc}$ represents the current luminance of the display screen; and determine the second component value of the display screen in the XYZ color space according to a formula $$Z_{sc} = \frac{X_{am}}{Y_{am}} Y_{sc},$$

where $Z_{sc}$ represents a Z component value of the display screen in the XYZ color space, and $Z_{am}$ represents a Z component value that is corresponding to the color parameter of the ambient light and that is in the XYZ color space.

With reference to any one of the fourth aspect, or the first to the fourth possible implementations of the fourth aspect, in a fifth possible implementation of the fourth aspect, the first conversion unit further includes: a conversion module, configured to: obtain a current luminance level of the display screen; and convert the current luminance level into the current luminance of the display screen based on a maximum luminance level of the display screen of the terminal and maximum luminance of the display screen.

With reference to any one of the fourth aspect, or the first to the fifth possible implementations of the fourth aspect, in a sixth possible implementation of the fourth aspect, the first conversion unit further includes: a third obtaining module, configured to calibrate, based on each component value corresponding to the display screen in the RGB color space and a preset adjustment factor of the component value, each component value corresponding to the display screen in the RGB color space, to obtain a calibrated component value of each component value corresponding to the display screen in the RGB color space.

With reference to any one of the fourth aspect, or the first to the sixth possible implementations of the fourth aspect, in a seventh possible implementation of the fourth aspect, the first conversion unit further includes a fourth obtaining module, where the fourth obtaining module is specifically configured to determine, from a preset lookup table and based on ambient information and the Y component value that is of the color parameter of the ambient light and that is in the XYZ color space, the preset adjustment factor of each component value corresponding to the display screen in the RGB color space, where the preset lookup table includes a correspondence between the Y component value and each component value corresponding to the display screen in the RGB color space, and the ambient information includes weather condition information, sunrise time information, and sunset time information.

With reference to any one of the fourth aspect, or the first to the seventh possible implementations of the fourth aspect, in an eighth possible implementation of the fourth aspect, the second obtaining module is specifically configured to: obtain a maximum component value from the component values corresponding to the display screen in the RGB color space; determine, as a normalized component value of each component value corresponding to the display screen in the RGB color space, a result obtained by dividing each component value corresponding to the display screen in the RGB color space by the maximum component value; and determine, as the second color parameter, the normalized component value of each component value corresponding to the display screen in the RGB color space.

With reference to any one of the fourth aspect, or the first to the eighth possible implementations of the fourth aspect, in a ninth possible implementation of the fourth aspect, at least one control point is provided in the color temperature adjustment region, and one control point is corresponding to one RGB parameter; and the first conversion unit includes: a third determining module, configured to determine, based on a relationship between coordinates of the touch point generated during the input operation and the color temperature adjustment region, polar coordinates of the input operation that are in the color temperature adjustment region; a fourth determining module, configured to determine, based on a location that is of the polar coordinates of the input operation and that is in the color temperature adjustment region, N control points corresponding to the input operation; and a second conversion module, configured to convert the polar coordinates of the input operation into the first color parameter based on RGB parameters of the N control points corresponding to the input operation and by using a gain interpolation algorithm.

With reference to any one of the fourth aspect, or the first to the ninth possible implementations of the fourth aspect, in a tenth possible implementation of the fourth aspect, the second conversion module is specifically configured to: when the polar coordinates of the input operation are the same as polar coordinates of any control point in the color temperature adjustment region, determine, as the first color parameter, an RGB parameter of the control point that has same polar coordinates as the input operation.

With reference to any one of the fourth aspect, or the first to the tenth possible implementations of the fourth aspect, in an eleventh possible implementation of the fourth aspect, when N≥2, a closed region enclosed by a closed curve including the N control points includes the polar coordinates of the input operation; and the second conversion module is further specifically configured to: when the polar coordinates of the input operation are different from polar coordinates of any one of the N control points, obtain a component value that is corresponding to at least one first intersection point and that is in target color space, where the first intersection point is a point at which the closed curve including the N control points is intersected with a line connecting a center of the color temperature adjustment region and the operation point that is of the input operation and that is in the color temperature adjustment region; determine, based on the component value that is corresponding to the at least one first intersection point and that is in the target color space, a component value that is corresponding to the polar coordinates of the input operation and that is in the target color space; convert, in the RGB space, the component value that is corresponding to the polar coordinates of the input operation and that is in the target color space, to obtain a component value that is of the polar coordinates of the input operation and that is in the RGB space; and determine, as the first RGB adjustment parameter, the component value that is of the polar coordinates of the input operation and that is in the RGB space.

With reference to any one of the fourth aspect, or the first to the eleventh possible implementations of the fourth aspect, in a twelfth possible implementation of the fourth aspect, the third determining module is specifically configured to: when determining that the touch point generated during the input operation is in the color temperature adjustment region, convert, into polar coordinates, the coordinates corresponding to the touch point generated during the input operation; or when determining that the touch point generated during the input operation is outside the color temperature adjustment region, obtain a target operation point that is of the input operation and that is in the color temperature adjustment region, where the target operation point is an operation point that is in the color temperature adjustment region and that is closest to the touch point; convert coordinates of the target operation point into polar coordinates; and determine the polar coordinates of the target operation point as the polar coordinates of the input operation that are in the color temperature adjustment region.

With reference to any one of the fourth aspect, or the first to the twelfth possible implementations of the fourth aspect, in a thirteenth possible implementation of the fourth aspect, the second conversion module is further specifically configured to obtain, according to a formula $$Y = [C_1, \ldots, C_N] \begin{bmatrix} \dfrac{\varphi_2}{\varphi_1 + \varphi_2} \\ \dfrac{\varphi_1}{\varphi_1 + \varphi_2} \end{bmatrix},$$

a component value that is corresponding to a first-first intersection point and that is in the target color space, where Y represents the component value that is corresponding to the first-first intersection point and that is in the target color space, $C_1$ represents a component value that is corresponding to a first control point and that is in the target color space, where the first control point is in the color temperature adjustment region and is corresponding to the first-first intersection point, $C_N$ represents a component value that is corresponding to an $N^{th}$ control point and that is in the target color space, where the $N^{th}$ control point is in the color temperature adjustment region and is corresponding to the first-first intersection point, $\varphi_1$ represents polar coordinates of an included angle formed by the first-first intersection point, a center of the color temperature adjustment region, and the first control point corresponding to the first-first intersection point, $\varphi_2$ separately represents polar coordinates of an included angle formed by the first-first intersection point, the center of the color temperature adjustment region, and a second control point corresponding to the first intersection point, and the first control point and the second control point are separately end points in a sub-region to which the first-first intersection point belongs.

With reference to any one of the fourth aspect, or the first to the thirteenth possible implementations of the fourth aspect, in a fourteenth possible implementation of the fourth aspect, the second conversion module is further specifically configured to determine, by using a formula $$R = [S_1, T_1] \begin{bmatrix} \dfrac{u}{u+v} \\ \dfrac{v}{u+v} \end{bmatrix},$$

the component value that is corresponding to the polar coordinates of the input operation and that is in the target color space, where u=$\rho_T$–$\rho$, v=$\rho$–$\rho_S$, T represents a component value that is corresponding to a first intersection point T and that is in the target color space, $S_1$ represents a component value that is corresponding to a first intersection point S and that is in the target color space, $\rho_T$ represents a radius of polar coordinates of the first intersection point T, rho represents a radius of the polar coordinates of the input operation, and $\rho_S$ represents a radius of polar coordinates of the first intersection point S.

With reference to any one of the fourth aspect, or the first to the fourteenth possible implementations of the fourth aspect, in a fifteenth possible implementation of the fourth aspect, the processing unit is specifically configured to:

integrate the first color parameter and the second color parameter according to a formula $$\begin{cases} r_3 = (\rho_1 r_2 + 1 - \rho_1)(\rho_2 r_1 + 1 - \rho_2) \\ g_3 = (\rho_1 g_2 + 1 - \rho_1)(\rho_2 g_1 + 1 - \rho_2), \\ b_3 = (\rho_1 b_2 + 1 - \rho_1)(\rho_2 b_1 + 1 - \rho_2) \end{cases}$$

to determine the third color parameter, where $\rho_1$ represents a first integration factor, $\rho_2$ represents a second integration factor, $r_3$ represents an R color component value in the third color parameter, $g_3$ represents a G color component value in the third color parameter, $b_3$ represents a B color component value in the third color parameter, $r_1$ represents an R color component value in the first color parameter, $g_1$ represents a G color component value in the first color parameter, $b_1$ represents a B color component in the first color parameter, $r_2$ represents an R color component value in the first color parameter, $g_2$ represents a G color component value in the first color parameter, and $b_2$ represents a B color component value in the first color parameter.

According to a fifth aspect, an embodiment of the present invention provides a readable medium, where the readable medium stores one or more programs, the one or more programs include a computer execution instruction, and when a processor of a terminal executes the computer execution instruction, the terminal executes the color temperature adjustment method according to any one of the first aspect, or the first to the fifteenth possible implementations of the first aspect.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show only some embodiments of the present invention, and persons of ordinary skill in the art may still derive other drawings from these accompanying drawings without creative efforts.

FIG. 8b is a second schematic diagram of a sub-region of a color temperature adjustment region according to an embodiment of the present invention;

FIG. 9 is a second schematic flowchart of a color temperature adjustment method according to an embodiment of the present invention;

DESCRIPTION OF EMBODIMENTS

The following describes the technical solutions in the embodiments of the present invention in detail with reference to the accompanying drawings in the embodiments of the present invention. Apparently, the described embodiments are only some but not all of the embodiments of the present invention.

It should be noted that, the terms "first", "second", and so on in the specification, claims, and accompanying drawings of the present invention are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. Moreover, the terms "include", "have" and any other variants mean to cover a non-exclusive inclusion, for example, a process, method, system, product, or device that includes a list of steps or units is not necessarily limited to those steps or units that are expressly listed, but may include other steps or units not expressly listed or inherent to such a process, method, product, or device.

A terminal provided in the embodiments of the present invention may be any terminal that has a display screen, a touch panel, or a touchscreen, for example, may be a mobile phone, a portable computer, a tablet computer, a personal digital assistant (personal digital assistant, PDA), a media player, a smart television, a smart wearable device (such as a smartwatch, smart glasses, and a smart band), an e-reader, a handheld game console, a POS (point of sale, point of sale), or an in-vehicle terminal (an in-vehicle computer). The terminal supports many application programs, and a user may interact with the application programs by touching the display screen or the touch panel. In the embodiments of the present invention, the user may be in contact with the touchscreen in any manner or by using any accessory, such as a stylus or a finger, to implement interaction.

Figure 1:
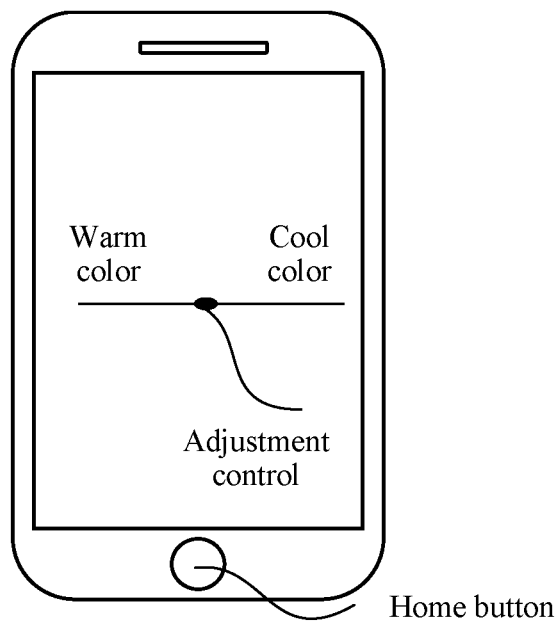
FIG. 1 is a first schematic structural diagram of an adjustment region in the prior art.
Figure 2:
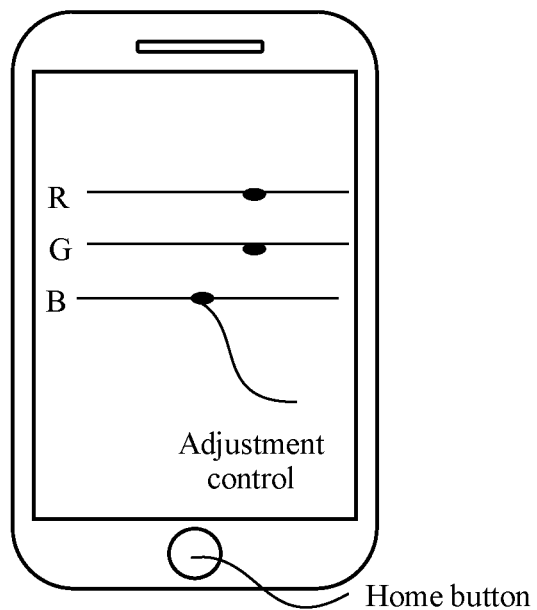
FIG. 2 is a second schematic structural diagram of an adjustment region in the prior art.
Figure 3:
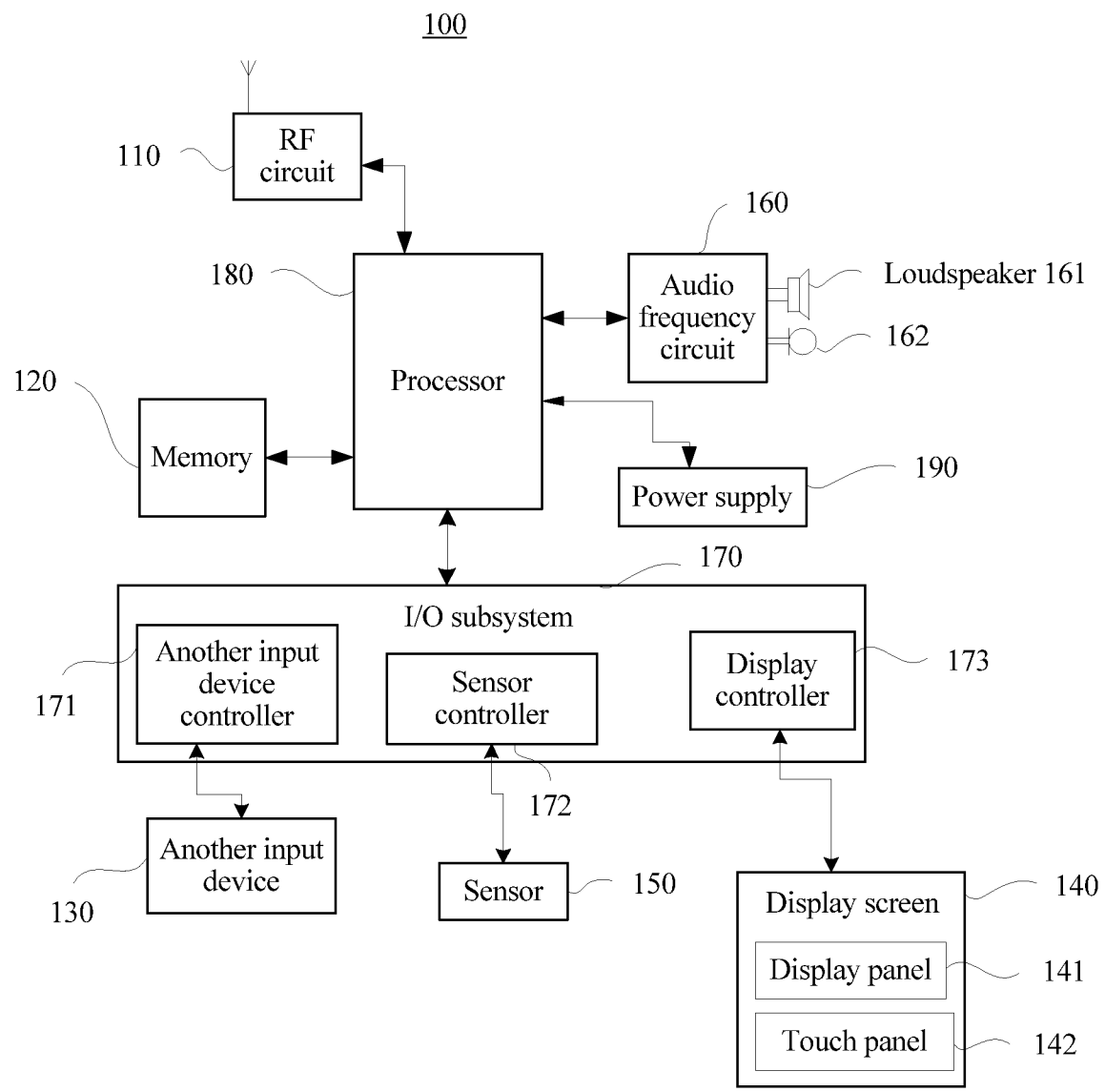
FIG. 3 is a schematic structural diagram of a terminal according to an embodiment of the present invention.

That the terminal is a mobile phone is used as an example. FIG. 3 shows a block diagram of a partial structure of a mobile phone 100 related to an embodiment of the present invention. Referring to FIG. 3, the mobile phone 100 includes components such as an RF (Radio Frequency, radio frequency) circuit 110, a memory 120, another input device 130, a display screen 140, a sensor 150, an audio frequency circuit 160, an I/O subsystem 170, a processor 180, and a power supply 190. Persons skilled in the art may understand that the structure of the mobile phone shown in FIG. 3 imposes no limitation on the mobile phone, and may include more or fewer components than those shown in the figure, combine some components, split some components, or have different component arrangements. In addition, the mobile phone 100 may include fewer user interfaces than those shown in the figure. The following describes each constituent component of the mobile phone 100 in detail with reference to FIG. 3.

The RF circuit 110 may be configured to receive and send a signal in an information receiving/sending process or a call process. Particularly, after receiving downlink information from a base station, the RF circuit 110 sends the downlink information to the processor 180 for processing, and in addition, sends designed uplink data to the base station. Generally, the RF circuit includes but is not limited to an antenna, at least one amplifier, a transceiver, a coupler, an LNA (Low Noise Amplifier, low noise amplifier), and a duplexer. In addition, the RF circuit 110 may further communicate with a network and another device through wireless communication. Any communications standard or protocol may be used for the wireless communication, including but not limited to: GSM (Global System for Mobile Communications, Global System for Mobile Communications), GPRS (General Packet Radio Service, general packet radio service), CDMA (Code Division Multiple Access, Code Division Multiple Access), WCDMA (Wideband Code Division Multiple Access, Wideband Code Division Multiple Access), LTE (Long Term Evolution, Long Term Evolution), email, and SMS (short message service, short message service).

The memory 120 may be configured to store a software program and a module. By running the software program and the module that are stored in the memory 120, the processor 180 executes various function applications of the mobile phone 100 and performs data processing. The memory 120 may mainly include a program storage area and a data storage area. The program storage area may store an operating system, an application program required by at least one function (such as a sound play function or an image play function), and the like. The data storage area may store data (such as audio data or a phonebook) created based on use of the mobile phone 100, and the like. In addition, the memory 120 may include a high-speed random access memory, and may further include a nonvolatile memory, such as at least one magnetic disk storage device, a flash memory device, or another volatile solid-state storage device.

The another input device 130 may be configured to: receive entered digital or character information, and generate key signal input related to a user setting and function control of the mobile phone 100. Specifically, the another input device 130 may include but is not limited to one or more of a physical keyboard, a function key (such as a volume control key or an on/off key), a trackball, a mouse, a joystick, or an optical mouse (the optical mouse is a touch-sensitive surface that does not display visual output, or an extension of a touch-sensitive surface formed by a touchscreen). The another input device 130 is connected to another input device controller 171 of the I/O subsystem 170, and performs signal exchange with the processor 180 under the control of the another input device controller 171.

The display screen 140 may be configured to display information entered by a user or information provided for a user, and various menus of the mobile phone 100, and may further receive user input. Specifically, the display screen 140 may include a display panel 141 and a touch panel 142. The display panel 141 may be configured in a form of an LCD (Liquid Crystal Display, liquid crystal display), an OLED (Organic Light-Emitting Diode, organic light-emitting diode), or the like.

The touch panel 142 is also referred to as a touchscreen, a touch-sensitive screen, or the like, and may collect a touch or non-touch operation (such as an operation performed by the user on or near the touch panel 142 by using any proper object or accessory such as a finger or a stylus, or a somatosensory operation, where the operation includes an operation type such as a single-point control operation or a multipoint control operation) of the user on or near the touch panel 142, and drive a corresponding connection apparatus based on a preset program. Optionally, the touch panel 142 may include two parts: a touch detection apparatus and a touch controller. The touch detection apparatus detects a touch location and a touch gesture of the user, detects a signal brought by a touch operation, and sends the signal to the touch controller. The touch controller receives touch information from the touch detection apparatus, converts the touch information into information that can be processed by the processor, and then sends the information to the processor 180, and can receive and execute a command sent by the processor 180. In addition, the touch panel 142 may be implemented in a plurality of types such as a resistive type, a capacitive type, an infrared ray type, and a surface acoustic wave type, or the touch panel 142 may be implemented by using any future technology. Further, the touch panel 142 may cover the display panel 141, and the user may perform, based on content displayed on the display panel 141 (the displayed content includes but is not limited to a soft keyboard, a virtual mouse, a virtual key, and an icon), an operation on or near the touch panel 142 that covers the display panel 141. After detecting the operation on or near the touch panel 142, the touch panel 142 sends the operation to the processor 180 by using the I/O subsystem 170 to determine user input. Then, the processor 180 provides corresponding visual output on the display panel 141 based on the user input and by using the I/O subsystem 170. Although the touch panel 142 and the display panel 141 in FIG. 3 are used as two independent components to implement input and input functions of the mobile phone 100, in some embodiments, the touch panel 142 and the display panel 141 may be integrated to implement the input and output functions of the mobile phone 100.

The mobile phone 100 may further include at least one sensor 150, such as a light sensor, a motion sensor, and another sensor. Specifically, the light sensor may include an ambient light sensor and a proximity sensor. The ambient light sensor may adjust luminance of the display panel 141 based on brightness or dimness of ambient light. The proximity sensor may turn off the display panel 141 and/or backlight when the mobile phone 100 moves to an ear of the user. As a type of motion sensor, an accelerometer sensor may detect a value of an acceleration in each direction (usually, three axes), may detect a value and a direction of gravity when the sensor is stationary, and may be used in an application for identifying a mobile phone posture (such as screen switching between a landscape mode and a portrait mode, a related game, and magnetometer posture calibration), a function related to vibration identification (such as a pedometer or a knock), and the like. Other sensors such as a gyroscope, a barometer, a hygrometer, a thermometer, and an infrared sensor may be further disposed on the mobile phone 100. Details are not described herein.

The audio frequency circuit 160, a loudspeaker 161, and a microphone 162 may provide an audio interface between the user and the mobile phone 100. The audio frequency circuit 160 may convert received audio data into a signal, and transmit the signal to the loudspeaker 161, and the loudspeaker 161 converts the signal into a sound signal for output. In another aspect, the microphone 162 converts a collected sound signal into a signal, and the audio frequency circuit 160 converts the signal into audio data after receiving the signal, and then outputs the audio data to the RF circuit 110, to send the audio data to, for example, another mobile phone, or output the audio data to the memory 120 for further processing.

The I/O subsystem 170 is configured to detect an external input/output device, and may include the another input device controller 171, a sensor controller 172, and a display controller 173. Optionally, one or more other input device controllers 171 receive a signal from the another input device 130 and/or send a signal to the another input device 130. The another input device 130 may include a physical button (a press button, a rocker button, or the like), a dial pad, a slider switch, a joystick, a click scroll wheel, and an optical mouse (the optical mouse is a touch-sensitive surface that does not display visual output, or an extension of a touch-sensitive surface formed by a touchscreen). It should be noted that the another input device controller 171 may be connected to any one or more of the foregoing devices. The display controller 173 in the I/O subsystem 170 receives a signal from the display screen 140 and/or sends a signal to the display screen 140. After the display screen 140 detects user input, the display controller 173 converts the detected user input into interaction with a user interface object displayed on the display screen 140, to implement human-computer interaction. The sensor controller 172 may receive a signal from one or more sensors 150 and/or send a signal to one or more sensors 150. Certainly, the one or more sensors 150 of the terminal in this application include an ambient light sensor (ALS, Ambient Light Sensor). The ambient light sensor is configured to detect ambient light of the terminal, and the ambient light sensor may continuously or periodically monitor the ambient light of the terminal. Certainly, the one or more sensors 150 may further include a location sensor which is configured to determine a location of the terminal and may continuously or periodically monitor the location of the terminal.

The processor 180 is a control center of the mobile phone 100, connects various parts of the entire mobile phone by using various interfaces and lines, and executes various functions of the mobile phone 100 and performs data processing by running or executing the software program and/or the module that are/is stored in the memory 120 and by invoking data stored in the memory 120, to perform overall monitoring on the mobile phone. Optionally, the processor 180 may include one or more processing units. An application processor and a modem processor may be integrated into the processor 180. The application processor mainly processes an operating system, a user interface, an application program, and the like. The modem processor mainly processes wireless communication. It may be understood that the foregoing modem processor may not be integrated into the processor 180.

The mobile phone 100 further includes the power supply 190 (such as a battery) that supplies power to each component. Optionally, the power supply may be logically connected to the processor 180 by using a power supply management system, to implement functions such as charging management, discharging management, and power consumption management by using the power supply management system. Although not shown, the mobile phone 100 may further include a camera, a Wireless Fidelity (wireless fidelity, WiFi) module, a Global Positioning System (Global Positioning System, GPS) module, a Bluetooth module, and the like. Details are not described in this embodiment of the present invention.

The terminal in the embodiments of the present invention may be divided into the following five layers based on a logical structure: a UI (User Interface, user interface) layer, an application layer (Application Layer, also referred to as an APP layer), a framework layer (Framework Layer, also referred to as a Frameworks layer), a hardware abstraction layer (Hardware Abstraction Layer, HAL), a driver layer (Driver Layer), and a coder-decoder layer (Coder-Decoder Layer, CODEC). The CODEC layer belongs to a hardware layer. The framework layer, the hardware abstraction layer, the drive layer, and the CODEC layer that are under the application layer may be referred to as system underlying layers.

The UI layer is used to complete human-computer interaction, and a color temperature adjustment region is created at the UI layer. Each operation point in the color temperature adjustment region is used to display one color. Different operation points display different colors. In addition, an adjustment control is further provided in the color temperature adjustment region at the UI layer. A location of the adjustment control varies with an input operation of a user. In addition, the adjustment control is further used to collect the input operation.

A gain interpolation algorithm is set at the APP layer, and a processor of the terminal may convert, into a first color parameter by invoking the gain interpolation algorithm, coordinates of an operation point corresponding to the input operation.

An adaptive adjustment algorithm is set at the frameworks layer, and the processor of the terminal converts a color parameter of ambient light into a second color parameter by invoking the adaptive adjustment algorithm.

The HAL layer is used to shield a color temperature difference of a display screen by using code.

A color temperature adjustment method provided in the embodiments of the present invention may be executed by using the terminal shown in FIG. 3.

Figure 4:
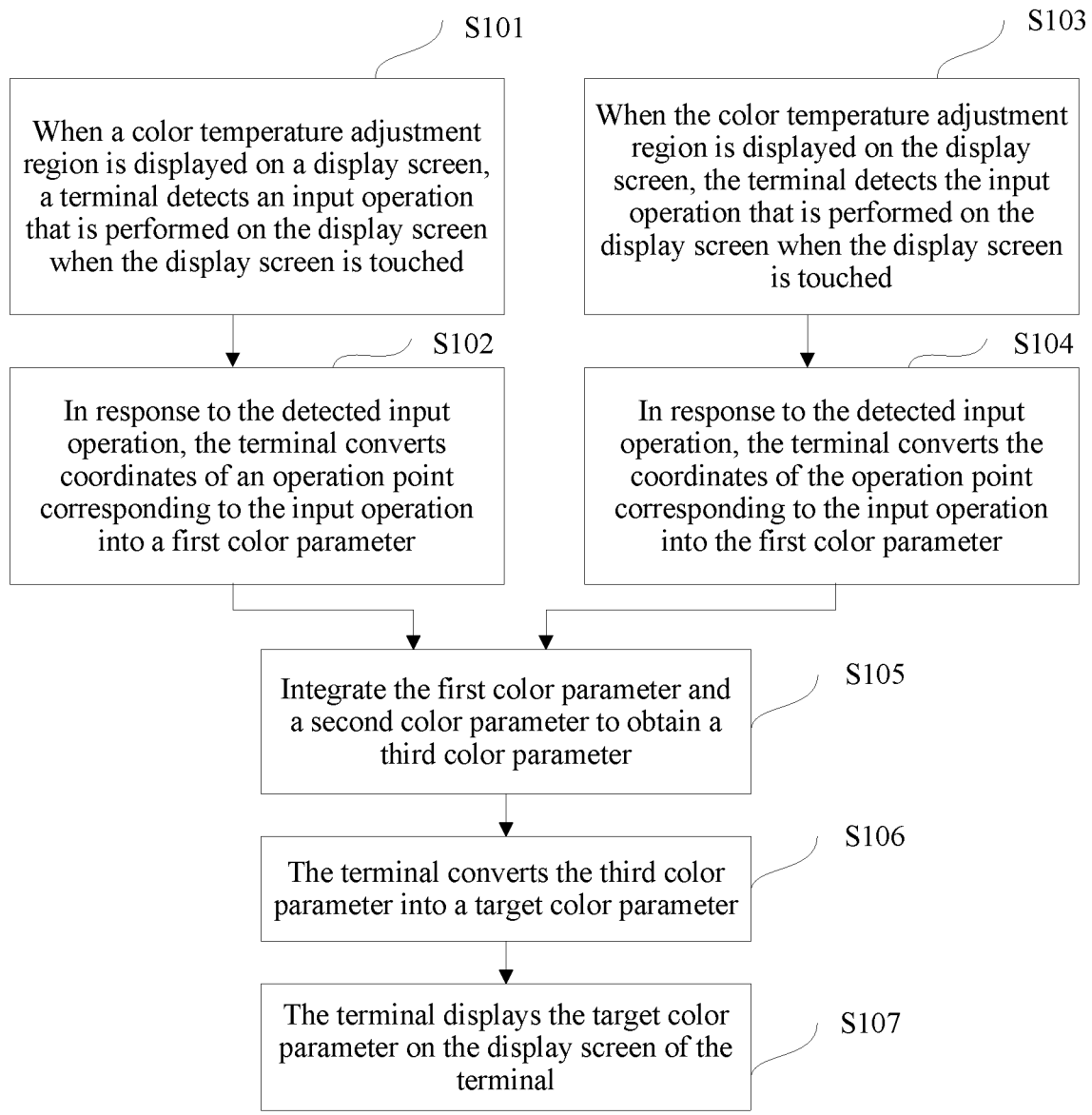
FIG. 4 is a first schematic flowchart of a color temperature adjustment method according to an embodiment of the present invention.

As shown in FIG. 4, an embodiment of the present invention provides a color temperature adjustment method. The method is applied to a terminal. Each operation point in a color temperature adjustment region is used to display one color, different operation points are used to display different colors, and one color is corresponding to one color temperature. As shown in FIG. 4, the method includes the following steps:

S101. When the color temperature adjustment region is displayed on a display screen, the terminal detects an input operation that is performed on the display screen when the display screen is touched, where a touch point generated during the input operation is corresponding to one operation point in the color temperature adjustment region.

S102. In response to the detected input operation, the terminal converts coordinates of the operation point corresponding to the input operation into a first color parameter.

S103. The terminal obtains ambient light by using an ambient light sensor of the terminal.

S104. The terminal converts a color parameter of the ambient light into a second color parameter.

S105. The terminal integrates the first color parameter and the second color parameter to obtain a third color parameter.

S106. The terminal converts the third color parameter into a target color parameter, where each component value in the target color parameter matches RGB channels of the terminal that are corresponding to each component value.

S107. The terminal displays the target color parameter on the display screen of the terminal.

The color temperature adjustment method provided in this embodiment of the present invention may be executed by the terminal shown in FIG. 3, and specifically, the color temperature adjustment method may be executed by a processor, a system underlying layer, and the display screen of the terminal. The display screen is configured to display the target color parameter, and the terminal converts the third color parameter into the target color parameter by using the system underlying layer.

In the color temperature adjustment method provided in this embodiment of the present invention, an intuitive color temperature adjustment region with a broad adjustable range is first provided for a user in a display interface of the terminal in this embodiment of the present invention, so that the terminal can collect an input operation in which the user performs color temperature adjustment on the display screen based on a color preference. Display screens of different vendors have different color temperatures, and different batches of display screens provided by a same vendor also usually have different color temperatures. Therefore, in this embodiment of the present invention, the first color parameter is obtained based on the input operation collected by the terminal, and the first color parameter and the second color parameter of the ambient light are integrated. In this way, in different ambient light conditions, the terminal can effectively compensate for a color temperature difference of the display screen based on the input operation and the ambient light, so that a finally adjusted color temperature of the display screen does not show a difference, and the color temperature of the display screen of the terminal matches a chromatic adaptation characteristic of human vision in different ambient light conditions. In addition to this, digital visual fatigue is reduced and sleep is improved.

Steps S101 and S102 and steps S103 and S104 in this embodiment of the present invention may be performed in parallel, namely, steps S103 and S104 are performed while steps S101 and S102 are performed; or steps S103 and S104 may be performed after steps S101 and S102 are performed; or step S102 and steps S103 and S104 may be simultaneously performed after step S101 is performed. Adjustment of a sequence of steps S101 to S104 does not affect a result of this embodiment of the present invention.

It should be noted that the color temperature adjustment region in this embodiment of the present invention may be divided into a plurality of regions based on a color attribute, colors in each region have a similar attribute or an error between color values of colors of every several adjacent operation points in each region is less than a preset error, and a color in each region in the color temperature adjustment region may be displayed as cyan, magenta, yellow, black, orange, green, or the like. A color corresponding to each operation point in the color temperature adjustment region and a color displayed in each region in the color temperature adjustment region in this embodiment of the present invention are only to provide a visual reference for the user, and are used to indicate an approximate color of a point selected by the user.

This embodiment of the present invention imposes no limitation on a manner for determining to display the color temperature adjustment region on the display screen. For example, the user may select, in an operation menu in an operation interface of the terminal, a function option for indicating invoking of the color temperature adjustment region. When the terminal detects that the function option for indicating invoking of the color temperature adjustment region is selected, the terminal determines to display the color temperature adjustment region on the display screen.

Alternatively, when the terminal detects that a first input operation for indicating invoking of the color temperature adjustment region exists on the display screen, the terminal determines to display the color temperature adjustment region on the display screen.

This embodiment of the present invention imposes no limitation on a manner for determining whether the input operation is performed on the display screen when the display screen is touched. For example, when a display screen color temperature adjustment interface is displayed on the display screen of the terminal, the display screen of the terminal may determine that the user performs the input operation on the display screen, provided that the display screen of the terminal detects that the user touches an adjustment control in the display screen color temperature adjustment interface or touches the display screen.

Specifically, the input operation in this embodiment of the present invention is used to adjust the color temperature of the display screen of the terminal. The input operation in this embodiment of the present invention may be finger touch of the user on the display screen, a touch point is generated when the finger touch is in contact with the display screen, and the touch point generated during the input operation may be in or outside the color temperature adjustment region. When the input operation is outside the color temperature adjustment region, the processor of the terminal obtains, from the color temperature adjustment region, an operation point that is in the color temperature adjustment region and that is corresponding to the touch point generated during the input operation, and obtains the first color parameter of the input operation by using coordinates of the operation point.

Specifically, in this embodiment of the present invention, whether the touch point generated during the input operation is outside or in the color temperature adjustment region may be determined by using a relationship between coordinates of the touch point generated during the input operation and coordinates of each operation point included in the color temperature adjustment region.

The color parameter in this embodiment of the present invention is an RGB (Red Green Blue, red green blue) parameter. To be specific, the color parameter includes an R (red) component value, a B (blue) component value, and a G (green) component value. One RGB parameter is corresponding to one color, and one color is corresponding to one color temperature.

In this embodiment of the present invention, the color temperature adjustment region may be understood as a region enclosed by a first closed curve, and a shape of the first closed curve may be any one of a circle, an ellipse, a rectangle, or an irregular shape. This is not limited in this embodiment of the present invention. In addition, in this embodiment of the present invention, the color temperature adjustment region enclosed by the first closed curve in any shape has a center. When the shape of the first closed curve is a circle, a center of the first closed curve is a center of the circle; or when the shape of the first closed curve is an ellipse, a center of the first closed curve is an origin. In addition, this embodiment of the present invention imposes no limitation on a size of the color temperature adjustment region. During actual use, a suitable size of the color temperature adjustment region may be determined based on a size of the display screen of the terminal, so that the entire terminal is more aesthetic when the color temperature adjustment region is displayed on the display screen.

In this embodiment of the present invention, the color temperature adjustment region includes a plurality of operation points, and each operation point is used to display one color. It may be understood that each operation point is corresponding to one color value, and different operation points have different color values. The color value may specifically include hue, saturation, brightness, a red component value, a green component value, and a blue component value. For example, a color value of a first operation point is hue 229, saturation 240, brightness 72, a red component value 152, a green component value 0, and a blue component value 43. A color value of a second operation point is hue 92, saturation 222, brightness 72, a red component value 5, a green component value 148, and a blue component value 48.

In this embodiment of the present invention, the ambient light may be obtained by using the ambient light sensor of the terminal, and after obtaining the ambient light, the ambient light sensor sends the ambient light to the processor of the terminal, so that the processor of the terminal determines the second color parameter based on the color parameter of the ambient light, to be specific, the processor of the terminal determines, based on the color parameter of the ambient light, an R component value, a B component value, and a G component value that are corresponding to the display screen of the terminal in RGB color space.

For example, different ambient conditions have different luminance. The color parameter of the ambient light collected by the ambient light sensor varies with an ambient condition of the terminal. For example, a color parameter of ambient light collected by the ambient light sensor when the terminal is in the shade of a tree is different from a color parameter of ambient light collected by the ambient light sensor when the terminal is in the sun.

Specifically, in this embodiment of the present invention, the third color parameter may be converted into a fourth color parameter in the following manner:

If each component value in the third color parameter does not match the RGB channels of the terminal that are corresponding to each component value, each component value in the third color parameter is converted into a target component value corresponding to the component value, and the target component value corresponding to each component value is determined as the target color parameter.

The RGB channels in this embodiment of the present invention are an R channel, a G channel, and a B channel. The R channel, the G channel, and the B channel are independent of each other. The R channel is used to send a component value of an R color, the G channel is used to send a component value of a G color, and the B channel is used to send a component value of a B color.

For example, because the third color parameter is a value from 0 to 1, if parameter values of the RGB channels of hardware of the display screen may be from 0 to 255 (8 bits are used as an example), the value that is from 0 to 1 and is of the third color parameter needs to be converted into that from 0 to 255, to match the RGB channels of the hardware of the display screen of the terminal.

In this embodiment of the present invention, at least one control point is provided in the color temperature adjustment region. One control point is corresponding to one RGB parameter, and the control point may overlap the operation point in the color temperature adjustment region.

Figure 5:
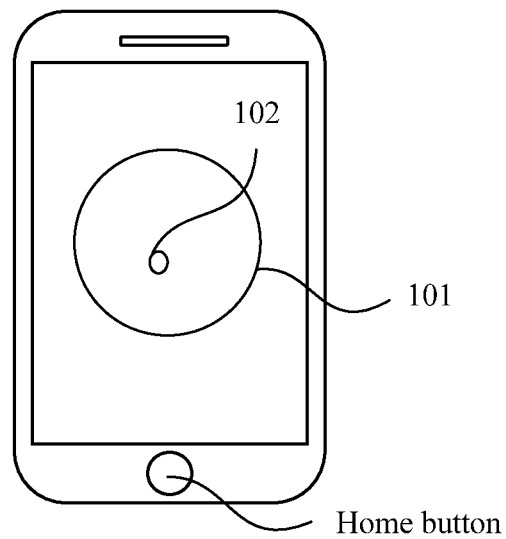
FIG. 5 is a first schematic diagram of a color temperature adjustment region according to an embodiment of the present invention.

Optionally, in this embodiment of the present invention, an adjustment control is provided in the color temperature adjustment region, a location of the adjustment control varies, in the color temperature adjustment region, with the input operation, and the adjustment control is used to indicate a color selected, during the input operation, in the color temperature adjustment region. As shown in FIG. 5, FIG. 5 shows a color temperature adjustment region 101 and an adjustment control 102. FIG. 5 does not show a color of each operation point in the color temperature adjustment region, and the color temperature adjustment region includes a plurality of colors in an actual process.

It should be noted that the adjustment control in this embodiment of the present invention has an initial location. It may be understood that, each time the user invokes the color temperature adjustment region, the adjustment control is displayed at the initial location. When the user uses the color temperature adjustment region, a location of the adjustment control moves from the initial location to a location of an operation point corresponding to the touch point generated during the input operation of the user.

The initial location may be a preset location that is set by the processor of the terminal. To be specific, the adjustment control is displayed at the preset location provided that the user invokes the color temperature adjustment region. For example, the preset location is C, and when the user invokes the color temperature adjustment region at a first moment, the adjustment control is displayed at the location C; when the user invokes the color temperature adjustment region at a second moment, the adjustment control is still displayed at the location C.

Certainly, the initial location may also be a location of an operation point corresponding to a touch point generated during a previous input operation of the user, namely, a location of an operation point corresponding to a touch point generated during an input operation of the user at the first moment. In this case, when the user completes color temperature adjustment at the first moment, exits from the color temperature adjustment region, and invokes the color temperature adjustment region at the second moment, the adjustment control is displayed at the location of the operation point corresponding to the touch point generated during the input operation at the first moment. For example, if the location of the touch point that is determined during the input operation performed by the user at the first moment is $C_1$, when the color temperature adjustment region is invoked at the second moment, the adjustment control is displayed at $C_1$; if a location that is determined during an input operation performed by the user at the second moment is $C_2$, and when the color temperature adjustment region is invoked at a third moment, the adjustment control is displayed at $C_2$.

It should be noted that the adjustment control may be always displayed in the color temperature adjustment region, or may be displayed, after the display screen detects the input operation of the user, at the location of the operation point corresponding to the touch point generated during the input operation.

Certainly, the adjustment control may further collect the input operation of the user. Specifically, when a color at the location of the adjustment control is exactly a color required by the user, the user may directly tap the adjustment control.

Figure 6:
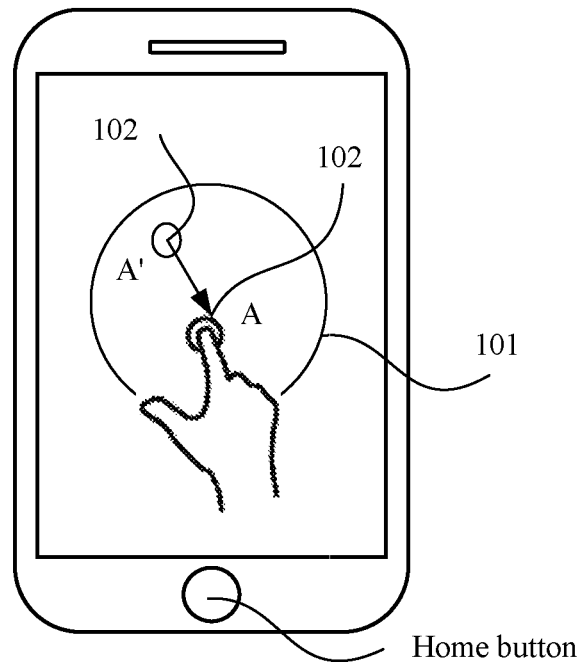
FIG. 6 is a second schematic diagram in which an input operation is in a color temperature adjustment region according to an embodiment of the present invention.

For example, as shown in FIG. 6, when the input operation (a point A shown in FIG. 6) is in the color temperature adjustment region 101, the adjustment control 102 is displayed at the coordinates of the touch point generated during the input operation. A' in FIG. 6 represents the initial location of the adjustment control, and A in FIG. 6 presents the location of the operation point corresponding to the touch point generated during the input operation; and when the input operation is in the color temperature adjustment region 101, the touch point of the input operation overlaps the operation point corresponding to the touch point of the input operation. After the operation shown in FIG. 5 is performed, the adjustment control 102 moves from the initial location A' to the location A of the touch point of the input operation.

Figure 7:
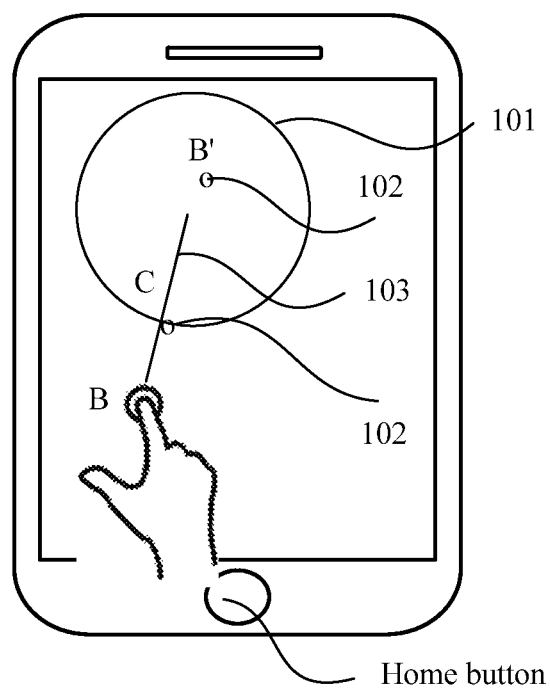
FIG. 7 is a second schematic diagram in which an input operation is outside a color temperature adjustment region according to an embodiment of the present invention.

As shown in FIG. 7, when the input operation (a point B shown in FIG. 7) is outside the color temperature adjustment region, the adjustment control 102 is displayed at coordinates of a target operation point (a point C shown in FIG. 7) on a first closed curve. The first closed curve is a curve enclosing the color temperature adjustment region 101, and the target operation point C is a point (the point C shown in FIG. 7) at which the color temperature adjustment region is intersected with a line (a line segment 103 shown in FIG. 7) connecting the touch point B generated during the input operation and a center of the color temperature adjustment region. In FIG. 7, B' represents the initial location of the adjustment control, and after the operation shown in FIG. 7 is performed, the adjustment control 102 moves from the initial location B' to a location of the target operation point C.

The color temperature adjustment region in this embodiment of the present invention includes at least one sub-region, each sub-region is enclosed by a closed curve, and at least one control point is provided on the closed curve, to be specific, the sub-region is enclosed by a closed curve that passes through the at least one control point. Adjacent sub-regions share one or more control points, and an RGB parameter of the control point is known.

Figure 8A:
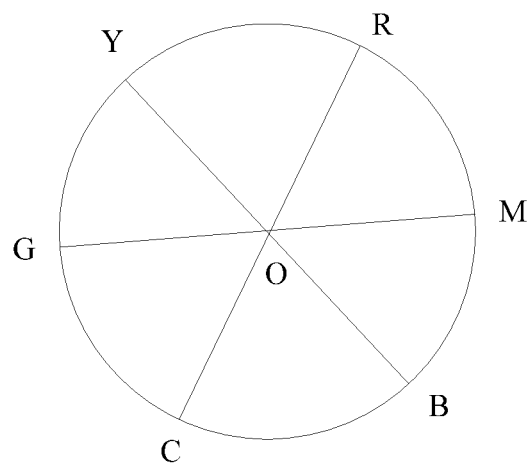
FIG. 8a is a first schematic diagram of a sub-region of a color temperature adjustment region according to an embodiment of the present invention.

In this embodiment of the present invention, that the color temperature adjustment region is a circle is used as an example for description. As shown in FIG. 8a, FIG. 8a shows a schematic diagram of a color temperature adjustment region according to an embodiment of the present invention. In FIG. 8a, the color temperature adjustment region may be considered to be enclosed by a first closed curve 201 that uses an origin O as a center of the circle (the center of the circle is also a control point, and an RGB parameter at the center of the circle is: R=1, B=1, and G=1) and uses R as a radius. The first closed curve is split into n equal parts (for example, if n is equal to 3, three equal split points are formed in FIG. 8a: a point R, a point G, and a point B; or if n=6, the color temperature adjustment region is split into six equal parts, and six equal split points are formed in FIG. 8a: a point R, a point G, a point B, a point C, a point M, and a point Y), and n sub-regions may be formed by connecting each equal split point and the origin O (namely, a radius between the equal split point and the origin O). In this embodiment of the present invention, each equal split point may be determined as a control point, an RGB parameter of a control point at a location of each equal split point is $\alpha_j$, $\beta_j$, and $\gamma_j$, (j=1, 2, . . . , k), $\alpha_j$, $\beta_j$, and $\gamma_j$ fall within [0, 1], and then m (m is greater than or equal to 1) control points may be provided on the radius connecting the origin O and each equal split point. For example, as shown in FIG. 8a, when the first closed curve is split into three equal parts, in the color temperature adjustment region shown in FIG. 8a, three sub-regions are formed: a sector GOB, a sector BOR, and a sector ROG The sector GOB and the sector BOR share the control point B and a control point on a radius OB, the sector BOR and the sector ROG share the control point R and a control point on a radius OR, and the sector ROG and the sector GOB share the control point G and a control point on a radius OG. For sub-regions included in the color temperature adjustment region when the first closed curve is split into six equal parts, refer to the sub-regions determined when the first closed curve is split into three equal parts. This is not limited in this embodiment of the present invention.

In this embodiment of the present invention, that the color temperature adjustment region is a circle is used as an example for description. As shown in FIG. 8b, FIG. 8b shows another schematic diagram of a color temperature adjustment region according to an embodiment of the present invention. In FIG. 8b, the color temperature adjustment region may be considered as concentric circles formed by M, which is at least two, circles that use a point $C_0$ as centers of the circles and have different radiuses. Then, the concentric circles formed by the at least two circles are split into n equal parts, points at which each equal split line is intersected with the at least two circles are determined as control points, and at least one control point is provided on a radius connecting each control point and the center $C_0$ of the circles. For example, as shown in FIG. 8b, intersection points $C_4$, $C_1$, $C_2$, and $C_3$ are control points. In the color temperature adjustment region shown in FIG. 8b, a sector $C_4C_0C_3$ forms a sub-region, a region other than the sector $C_4C_0C_3$ in an inner circle 802 forms a sub-region, an annular sector $C_1C_4C_3C_2$ forms a sub-region, the annular sector $C_1C_4C_3C_2$ between the inner circle 802 and an external circle 801 forms a sub-region, and a region other than the annular sector $C_1C_4C_3C_2$ in a region between the inner circle 802 and the external circle 801 forms a sub-region.

It should be noted that, in this embodiment of the present invention, an RGB parameter at the center of the color temperature adjustment region is: R=1, G=1, and B=1.

At least one control point is provided in the color temperature adjustment region in this embodiment of the present invention, one control point is corresponding to one RGB parameter, and the RGB parameter is known. The RGB parameter includes an R component value, a B component value, and a G component value, one RGB parameter is corresponding to one color, and one color has one color temperature. Therefore, the color temperature of the terminal may be adjusted by adjusting the RGB parameter.

In the color temperature adjustment region shown in FIG. 8a and FIG. 8b, an RGB parameter at the origin O is: R=1, B=1, and G=1.

As shown in FIG. 9, step S102 in this embodiment of the present invention may be implemented in the following manner.

S1021. Determine, based on a relationship between coordinates of the touch point generated during the input operation and the color temperature adjustment region, polar coordinates of the input operation that are in the color temperature adjustment region.

In an actual operating process, the input operation of the user may be in or outside the color temperature adjustment region, but a manner, for determining the polar coordinates of the input operation that are in the color temperature adjustment region, existing when the input operation is in the color temperature adjustment region is different from that existing when the input operation is outside the color temperature adjustment region. Therefore, the following provides descriptions with reference to a detailed case.

On the one hand, when determining that the touch point generated during the input operation is in the color temperature adjustment region, the terminal converts, into polar coordinates, the coordinates corresponding to the touch point generated during the input operation.

On the other hand, when determining that the touch point generated during the input operation is outside the color temperature adjustment region, a target operation point that is of the input operation and that is in the color temperature adjustment region is obtained, where the target operation point is an operation point that is in the color temperature adjustment region and that is closest to the touch point;

coordinates of the target operation point are converted into polar coordinates; and the polar coordinates of the target operation point are determined as the polar coordinates of the input operation that are in the color temperature adjustment region.

For example, the polar coordinates of the target operation point generated during the input operation are (rho, theta), where rho is a radius of the polar coordinates of the target operation point, and theta is an angle of the polar coordinates of the target operation point.

Specifically, if the coordinates of the input operation are in the color temperature adjustment region, two-dimensional coordinates in a Cartesian coordinate system are converted into a polar coordinate system that uses the center of the color temperature adjustment region as an origin, and the polar coordinates of the operation point corresponding to the input operation are determined in the polar coordinate system.

If the coordinates of the input operation are outside the color temperature adjustment region, the operation point that is in the color temperature adjustment region and that is closest to the touch point generated during the input operation is used as the target operation point (a point at which the color temperature adjustment region is intersected with a line connecting the touch point generated during the input operation and the center of the color temperature adjustment region is used as the target operation point), then two-dimensional coordinates in a Cartesian coordinate system are converted into a polar coordinate system that uses the center of the color temperature adjustment region as an origin, and the polar coordinates of an operation point corresponding to the target operation point are determined in the polar coordinate system.

S1022. Determine, based on a location that is of the polar coordinates of the input operation and that is in the color temperature adjustment region, N control points corresponding to the input operation.

Specifically, step S1022 in this embodiment of the present invention may be implemented in the following manner:

S10221. If the polar coordinates of the input operation are in a first sub-region, determine N operation points included in the first sub-region as the N control points corresponding to the polar coordinates of the input operation, where the first sub-region is any sub-region in the color temperature adjustment region.

Figure 10A:
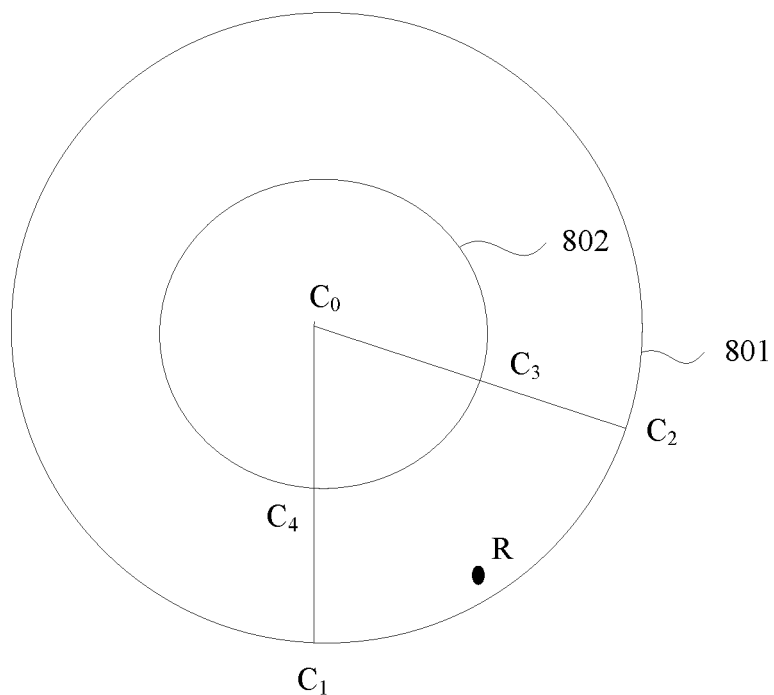
FIG. 10a is a schematic diagram of determining a control point of an input operation when the input operation is in a color temperature adjustment region according to an embodiment of the present invention.

For example, as shown in FIG. 10a, in this embodiment of the present invention, the color temperature adjustment region is divided into the following sub-regions: a sub-region formed by a sector $C_4C_0C_3$, a sub-region formed by a region other than the sector $C_4C_0C_3$ in an inner circle 802, a sub-region formed by an annular sector $C_1C_4C_3C_2$, a sub-region formed by the annular sector $C_1C_4C_3C_2$ between the inner circle 802 and an external circle 801, and a sub-region formed by a region other than the annular sector $C_1C_4C_3C_2$ in a region between the inner circle 802 and the external circle 801. In FIG. 10a, the touch point generated during the input operation is in the color temperature adjustment region, namely, a point R in FIG. 10a, and the control point R generated during the input operation is in a sub-region 20 formed by the annular sector $C_1C_4C_3C_2$. In this case, control points of the control point R generated during the input operation are a point $C_1$, a point $C_4$, a point $C_3$, and a point $C_2$.

Figure 10B:
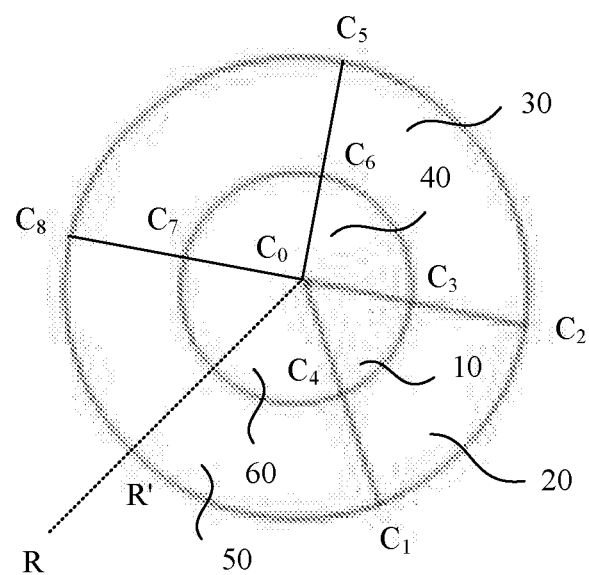
FIG. 10b is a schematic diagram of determining a control point of an input operation when the input operation is outside a color temperature adjustment region according to an embodiment of the present invention.

It should be noted that, if the touch point generated during the input operation is outside the color temperature adjustment region, when it is determined that the target operation point corresponding to the input operation is a point in the color temperature adjustment region, only a sub-region in which the target operation point is located needs to be determined, and a control point in the sub-region is determined as a control point of the target operation point. As shown in FIG. 10b, R in FIG. 10b is the touch point generated during the input operation, R' is the target operation point of the input operation, and because the target operation point R' is in a sub-region 50 formed by an annular sector $C_8C_7C_4C_1$, control points of the target operation point R' are a point $C_8$, a point $C_7$, a point $C_4$, and a point $C_1$.

S1023. Convert the polar coordinates of the input operation into the first color parameter based on RGB parameters of the N control points corresponding to the input operation and by using a gain interpolation algorithm.

A manner, for converting the polar coordinates of the input operation into the first color parameter, existing when the polar coordinates of the input operation are the same as polar coordinates of any control point in the color temperature adjustment region is different from that existing when the polar coordinates of the input operation are different from polar coordinates of any control point in the color temperature adjustment region. Therefore, the following provides detailed descriptions with reference to a specific case.

On the one hand, step S1023 may be implemented in the following manner:

S10231A. When the polar coordinates of the input operation are the same as polar coordinates of any control point in the color temperature adjustment region, determine, as the first color parameter, an RGB parameter of the control point that has same polar coordinates as the input operation.

Calculation complexity of the terminal may be reduced by performing step S10231. Because an RGB parameter of each control point is known, when determining that the polar coordinates of the input operation are the same as polar coordinates of any control point in the color temperature adjustment region, the terminal may directly obtain, from a preset database, an RGB parameter of the control point that has same polar coordinates as the input operation, and determine, as the first color parameter, the RGB parameter of the control point that has same polar coordinates as the input operation.

On the other hand, when N≥2, a closed region enclosed by a closed curve including N control points includes the polar coordinates of the input operation.

S10231B. When the polar coordinates of the input operation are different from polar coordinates of any one of the N control points, obtain a component value that is corresponding to at least one first intersection point and that is in target color space, where the first intersection point is a point at which the closed curve including the N control points is intersected with a line connecting a center of the color temperature adjustment region and the operation point that is of the input operation and that is in the color temperature adjustment region.

In this embodiment of the present invention, N may be any value greater than or equal to 2, and a larger N indicates more accurate polar coordinates that are determined by using the N control points and that are of the target operation point corresponding to the input operation, so that the determined first color parameter is more accurate. In addition, to reduce calculation complexity, for example, N in this embodiment of the present invention is 4 or 3. When N=3, the control points are any two control points and a control point at the center of the color temperature adjustment region. When N is equal to 4, the closed region including the polar coordinates of the input operation is the sub-region 50 formed by $C_8C_7C_4C_1$ shown in FIG. 10b. When N is greater than or equal to 4, it indicates that there are a plurality of control points on a radius between the center of the color temperature adjustment region and any control point on the first closed curve of the color temperature adjustment region; or when the color temperature adjustment region has a structure shown in FIG. 8b, there are a plurality of control points on a line connecting a control point that is on a closed curve and is in the color temperature adjustment region and a control point that is on another closed curve and is in the color temperature adjustment region, or there are a plurality of control points on a curve connecting two control points, provided that the N control points can form the closed region including the polar coordinates of the input operation. This is not limited in this embodiment of the present invention.

It should be noted that, the polar coordinates of the input operation may be in the closed region enclosed by the closed curve including the N control points, or on the closed curve of the closed region including the N control points.

Figure 11:
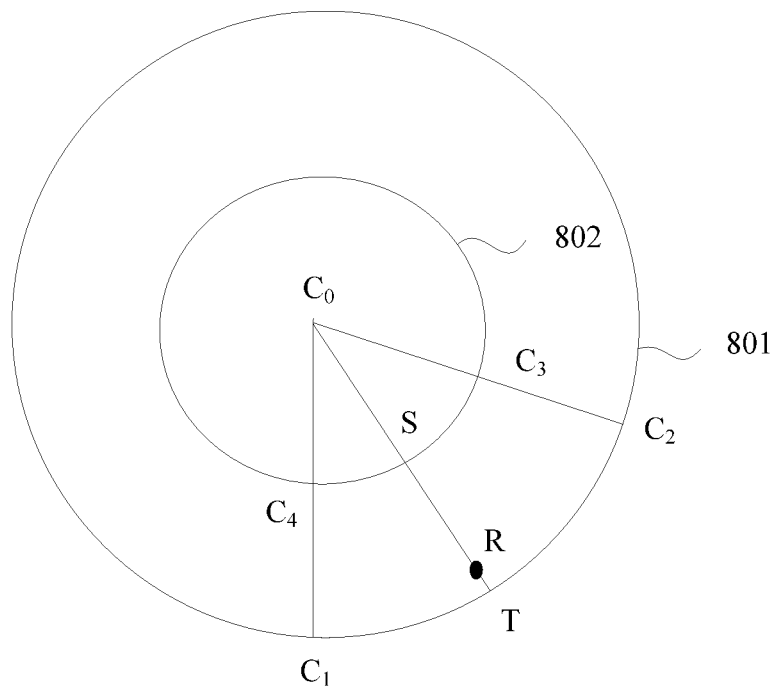
FIG. 11 is a schematic diagram of a first intersection point between an input operation and a color temperature adjustment region according to an embodiment of the present invention.

For example, as shown in FIG. 11, when the touch point generated during the input operation is the point R, if the sub-region of the color temperature adjustment region uses a structure shown in FIG. 8a, the first intersection point is a point T; or if the sub-region of the color temperature adjustment region uses structures shown in FIG. 8b, FIG. 10a, and FIG. 10b, first intersection points are a point S and a point T.

The target color space in this embodiment of the present invention is any one of RGB color space, XYZ color space, HSV color space, or LAB color space; or certainly, may include other color space.

This embodiment of the present invention imposes no limitation on a manner for obtaining the component value that is corresponding to the at least one first intersection point and that is in the target color space.

For a first-first intersection point, the first-first intersection point is any one of the at least one first intersection point. Because a manner and a principle for obtaining a component value that is corresponding to each first intersection point and that is in the target color space are the same as a manner and a principle of the first-first intersection point, only the first-first intersection point is used as an example for description in this embodiment of the present invention, and this does not have any indicative meaning.

For example, a component value that is corresponding to the first-first intersection point and that is in the target color space may be obtained according to a formula $$Y = [C_1, \ldots, C_N] \begin{bmatrix} \dfrac{\varphi_2}{\varphi_1 + \varphi_2} \\ \dfrac{\varphi_1}{\varphi_1 + \varphi_2} \end{bmatrix},$$

where Y represents the component value that is corresponding to the first-first intersection point and that is in the target color space, $C_1$ represents a component value that is corresponding to a first control point and that is in the target color space, where the first control point is in the color temperature adjustment region and is corresponding to the first-first intersection point, $C_N$ represents a component value that is corresponding to an $N^{th}$ control point and that is in the target color space, where the $N^{th}$ control point is in the color temperature adjustment region and is corresponding to the first-first intersection point, $\varphi_1$ represents polar coordinates of an included angle formed by the first-first intersection point, the center of the color temperature adjustment region, and the first control point corresponding to the first-first intersection point, $\varphi_2$ separately represents polar coordinates of an included angle formed by the first-first intersection point, the center of the color temperature adjustment region, and a second control point corresponding to the first intersection point, and the first control point and the second control point are separately end points in a sub-region to which the first-first intersection point belongs.

For example, as shown in FIG. 11, a component value that is corresponding to a first intersection point T and that is in the target color space may be obtained according to a formula $$Y = [C_1, C_2] \begin{bmatrix} \dfrac{\varphi_2}{\varphi_1 + \varphi_2} \\ \dfrac{\varphi_1}{\varphi_1 + \varphi_2} \end{bmatrix},$$

where Y represents the component value that is corresponding to the first intersection point T and that is in the target color space, $C_1$ and $C_2$ separately represent component values that are in the target color space and that are corresponding to control points in a sub-region to which the first intersection point T belongs, $\varphi_1$ represents polar coordinates of an included angle formed by the first intersection point T, the center of the color temperature adjustment region, and a control point $C_1$ corresponding to the first intersection point T, $\varphi_2$ represents polar coordinates of an included angle formed by the first intersection point T, the center of the color temperature adjustment region, and a control point $C_2$ corresponding to the first intersection point T, $\varphi_1$ represents polar coordinates of an angle $C_1C_0T$ or an angle $C_4C_0S$, $\varphi_2$ represents polar coordinates of an angle $C_2C_0T$ or an angle $C_3C_0S$, $\varphi_1$=theta–theta$_1$, namely, $\varphi_1$ is equal to a difference between polar coordinates of the target operation point R and polar coordinates of the control point $C_1$, and $\varphi_2$=theta$_2$–theta, namely, $\varphi_2$ is equal to a difference between polar coordinates of the control point $C_2$ and the polar coordinates of the target operation point R.

For example, as shown in FIG. 11, a component value that is corresponding to a first intersection point S and that is in the target color space may be obtained according to a formula $$Y = [C_4, C_3] \begin{bmatrix} \dfrac{\varphi_2}{\varphi_1 + \varphi_2} \\ \dfrac{\varphi_1}{\varphi_1 + \varphi_2} \end{bmatrix},$$

and $C_3$ and $C_4$ separately represent component values that are in the target color space and that are corresponding to control points in a sub-region to which the first intersection point S belongs.

S10232B. Determine, based on the component value that is corresponding to the at least one first intersection point and that is in the target color space, a component value that is corresponding to the polar coordinates of the input operation and that is in the target color space.

Specifically, step S10232B may be implemented in the following manner: The component value that is corresponding to the polar coordinates of the input operation and that is in the target color space is determined by using a formula $$R = [S_1, T_1] \begin{bmatrix} \dfrac{u}{u+v} \\ \dfrac{v}{u+v} \end{bmatrix},$$

where u=rho$_T$–rho, v=rho–rho$_S$, $T_1$ represents the component value that is corresponding to the first intersection point T and that is in the target color space, $S_1$ represents the component value that is corresponding to the first intersection point S and that is in the target color space, rho$_T$ represents a radius of polar coordinates of the first intersection point T, rho represents a radius of the polar coordinates of the input operation, and rho$_S$ represents a radius of polar coordinates of the first intersection point S.

S10233B. Convert, in RGB space, the component value that is corresponding to the polar coordinates of the input operation and that is in the target color space, to obtain a component value that is of the polar coordinates of the input operation and that is in the RGB space.

S10234B. Determine, as the first RGB adjustment parameter, the component value that is of the polar coordinates of the input operation and that is in the RGB space.

It may be understood that, in this embodiment of the present invention, after the foregoing step S10231A and steps S10231B to S10234B are performed, it may be determined that the first color parameter is $r_1$, $g_1$, and $b_1$.

Color ratios of the RGB channels of the display screen need to be the same as color ratios of RGB channels in the ambient light, so that the user finds no difference when the color temperature of the display screen of the terminal is adjusted; and in addition, XYZ space is color space defined based on a human visual characteristic. Therefore, after the color parameter of the ambient light is converted into that in the XYZ color space, the ambient light more meets the human visual characteristic.

Optionally, step S104 may be implemented in the following manner:

S1041. Obtain component values that are corresponding to the color parameter of the ambient light and that are in XYZ color space.

For example, step S1041 in this embodiment of the present invention may be specifically implemented in the following manner:

The component values that are corresponding to the RGB parameter and that are in the XYZ color space are determined according to a formula $$\begin{bmatrix} X_{am} \\ Y_{am} \\ Z_{am} \end{bmatrix} = \begin{bmatrix} c_{11} & c_{12} & c_{13} \\ c_{21} & c_{22} & c_{23} \\ c_{31} & c_{32} & c_{33} \end{bmatrix} \begin{bmatrix} R_{am} \\ G_{am} \\ B_{am} \end{bmatrix},$$

where $X_{am}$ represents an X component value that is of the RGB parameter and that is in the XYZ color space, $Y_{am}$ represents a Y component value that is of the RGB parameter and that is in the XYZ color space, $Z_{am}$ represents a Z component value that is of the RGB parameter and that is in the XYZ color space, $R_{am}$ represents an R component value of the color parameter of the ambient light, $G_{am}$ represents a G component value of the color parameter of the ambient light, and $B_{am}$ represents a B component value of the color parameter of the ambient light.

For specific parameters in $$\begin{bmatrix} c_{11} & c_{12} & c_{13} \\ c_{21} & c_{22} & c_{23} \\ c_{31} & c_{32} & c_{33} \end{bmatrix},$$

refer to a standard conversion formula of the International Commission on Illumination CIE.

S1042. Determine a first component value and a second component value of the display screen in the XYZ color space based on current luminance of the display screen and the component values that are corresponding to the color parameter of the ambient light and that are in the XYZ color space.

The current luminance of the display screen may be implemented in the following manner:

A current luminance level of the display screen is obtained; and the current luminance level is converted into the current luminance of the display screen based on a maximum luminance level of the display screen of the terminal and maximum luminance of the display screen.

For example, if the maximum luminance level of the display screen is 255, the current luminance level is 100, and the maximum luminance of the screen is 500 nits, the current luminance of the display screen $Y_{sc}=500\times100/255$. A physical value (500 nits) of the maximum luminance of the screen, the maximum luminance level (255), and the current luminance level (100) are stored in a memory of the terminal.

For example, step S1042 may be specifically implemented in the following manner:

S10421. Determine the first component value of the display screen in the XYZ color space according to a formula $$X_{sc} = \frac{X_{am}}{Y_{am}} Y_{sc},$$

where $X_{sc}$ represents the first component value of the display screen in the XYZ color space, $X_{am}$ represents an X component value that is corresponding to the color parameter of the ambient light and that is in the XYZ color space, $Y_{am}$ represents a Y component value that is corresponding to the color parameter of the ambient light and that is in the XYZ color space, and $Y_{sc}$ represents the current luminance of the display screen.

S10422. Determine the second component value of the display screen in the XYZ color space according to a formula $$Z_{sc} = \frac{Z_{am}}{Y_{am}} Y_{sc},$$

where $Z_{sc}$ represents a Z component value of the display screen in the XYZ color space, and $Z_{am}$ represents a Z component value that is corresponding to the color parameter of the ambient light and that is in the XYZ color space.

It should be noted that, step S10421 and step S10422 may be simultaneously performed; or step S10421 may be performed before step S10422 is performed; or step S10422 is performed before step S10421 is performed. A sequence of performing step S10421 and S10422 does not affect determining of each component value corresponding to the display screen in this embodiment of the present invention.

In the XYZ color space, a value of Y represents luminance. Therefore, in this embodiment of the present invention, after step S10421 and step S10422 are performed, an X component and a Z component that are of a color parameter of the display screen and are in the XYZ color space may be determined, and the parameter of the display screen in the XYZ color space is $X_{sc}$, $Y_{sc}$, and $Z_{sc}$.

S1043. Determine, based on the first component value, the current luminance of the display screen, and the second component value, each component value corresponding to the display screen in RGB color space.

For example, step S1043 may be specifically implemented in the following manner:

Each component value corresponding to the display screen in the RGB color space is determined according to a formula $$\begin{bmatrix} R_{sc} \\ G_{sc} \\ B_{sc} \end{bmatrix} = \begin{bmatrix} c_{11} & c_{12} & c_{13} \\ c_{21} & c_{22} & c_{23} \\ c_{31} & c_{32} & c_{33} \end{bmatrix}^{-1} \begin{bmatrix} X_{sc} \\ Y_{sc} \\ Z_{sc} \end{bmatrix}.$$

$R_{sc}$ represents an R component value of the display screen in the RGB color space, $G_{sc}$ represents a G component value of the display screen in the RGB color space, and $B_{sc}$ represents a B component value of the display screen in the RGB color space.

For specific parameters in $$\begin{bmatrix} c_{11} & c_{12} & c_{13} \\ c_{21} & c_{22} & c_{23} \\ c_{31} & c_{32} & c_{33} \end{bmatrix},$$

refer to a standard conversion formula of the International Commission on Illumination CIE.

S1044. Perform normalization processing on each component value corresponding to the display screen in the RGB color space, to obtain the second color parameter.

Specifically, step S1044 may be implemented in the following manner:

S10441. Obtain a maximum component value from the component values corresponding to the display screen in the RGB color space.

S10442. Determine, as a normalized component value of each component value corresponding to the display screen in the RGB color space, a result obtained by dividing each component value corresponding to the display screen in the RGB color space by the maximum component value.

S10443. Determine, as the second color parameter, the normalized component value of each component value corresponding to the display screen in the RGB color space.

For example, normalization processing may be performed, by using a formula $$r_2 = \frac{R_{sc}}{MAX(R_{sc}, G_{sc}, B_{sc})},$$

on the R component value corresponding to the display screen in the RGB color space, where $r_2$ represents a normalized component of the R component value corresponding to the display screen in the RGB color space, $R_{sc}$ represents the R component value corresponding to the display screen in the RGB color space, $G_{sc}$ represents the G component value corresponding to the display screen in the RGB color space, and $B_{sc}$ represents the B component value corresponding to the display screen in the RGB color space.

Normalization processing may be performed, by using a formula $$g_2 = \frac{G_{sc}}{MAX(R_{sc}, G_{sc}, B_{sc})},$$

the G component value corresponding to the display screen in the RGB color space, where $g_2$ represents a normalized component of the G component value corresponding to the display screen in the RGB color space, $R_{sc}$ represents the R component value corresponding to the display screen in the RGB color space, $G_{sc}$ represents the G component value corresponding to the display screen in the RGB color space, and $B_{sc}$ represents the B component value corresponding to the display screen in the RGB color space.

Normalization processing may be performed, by using a formula $$b_2 = \frac{B_{sc}}{MAX(R_{sc}, G_{sc}, B_{sc})},$$

on the B component value corresponding to the display screen in the RGB color space, where $b_2$ represents a normalized component of the B component value corresponding to the display screen in the RGB color space, $R_{sc}$ represents the R component value corresponding to the display screen in the RGB color space, $G_{sc}$ represents the G component value corresponding to the display screen in the RGB color space, and $B_{sc}$ represents the B component value corresponding to the display screen in the RGB color space.

In this embodiment of the present invention, the second color parameter obtained by performing step S1024 is $r_2$, $g_2$, and $b_2$, and values of $r_2$, $g_2$, and $b_2$ in this embodiment of the present invention fall within [0, 1].

To make the determined second color parameter in this embodiment of the present invention more accurate, in this embodiment of the present invention, before step S1044 is performed, the method further includes step S1045.

S1045. Calibrate, based on each component value corresponding to the display screen in the RGB color space and a preset adjustment factor of the component value, each component value corresponding to the display screen in the RGB color space, to obtain a calibrated component value of each component value corresponding to the display screen in the RGB color space.

Specifically, step S1045 in this embodiment of the present invention may be implemented in the following manner:

S10451. Determine, as the calibrated component value of each component value corresponding to the display screen in the RGB color space, a product of each component value corresponding to the display screen in the RGB color space and the preset adjustment factor corresponding to the component value.

For example, a calibrated R component value of the display screen in the RGB color space may be obtained according to a formula $R_c = \alpha R_{sc}$, where $R_c$ represents the calibrated R component value of the display screen in the RGB color space, and $\alpha$ represents a preset adjustment factor of the R component value of the display screen in the RGB color space.

A calibrated G component value of the display screen in the RGB color space is obtained according to a formula $G_c = \beta G_{sc}$, where $G_c$ represents the calibrated G component value of the display screen in the RGB color space, and $\beta$ represents a preset adjustment factor of the G component value of the display screen in the RGB color space.

A calibrated B component value of the display screen in the RGB color space is obtained according to a formula $B_c = \gamma B_{sc}$, where $B_c$ represents the calibrated B component value of the display screen in the RGB color space, and $\gamma$ represents a preset adjustment factor of the B component value of the display screen in the RGB color space.

Optionally, in this embodiment of the present invention, before step S1045 is performed, the method further includes step S1046.

S1046. Determine, from a preset lookup table and based on ambient information and the Y component value that is of the color parameter of the ambient light and that is in the XYZ color space, the preset adjustment factor of each component value corresponding to the display screen in the RGB color space, where the preset lookup table includes a correspondence between the Y component value and each component value corresponding to the display screen in the RGB color space, and the ambient information includes weather condition information, sunrise time information, and sunset time information.

For example, the R component value corresponding to the display screen in the RGB color space includes a plurality of preset adjustment factors, and each preset adjustment factor is in a one-to-one correspondence with the Y component value.

In this embodiment of the present invention, the ambient information may further include a geographic location and time or a date.

Specifically, the weather condition information, the sunrise time information, the sunset time information, the time/date and the geographic location of the terminal, and the like in this embodiment of the present invention may be obtained through interaction between the terminal and a network side, or may be obtained from a date lookup table preset in the terminal.

For example, the terminal may obtain time or a date at a location of the terminal by interacting with the network side, and obtain current latitude and longitude information of the terminal in real time or periodically by using a positioning system such as a Global Positioning System (Global Positioning System, GPS), GLONASS, Galileo or BeiDou of the terminal or by using a base station or Wireless Fidelity (Wireless Fidelity, WiFi), to determine a geographic location of the terminal and sunset time information and sunrise time information at the location of the terminal.

The foregoing steps may be performed by a terminal such as a mobile phone, or a positioning and navigation apparatus that has a communication function.

The preset lookup table in this embodiment of the present invention is also referred to as a 3-dimensional lookup table (3D LUT, 3-dimensional lookup table), and is stored in the memory of the terminal.

For example, the terminal determines a location of the terminal based on GPS, and obtains a time at the location of the terminal by interacting with the network side. If the time at the location of the terminal indicates that it is daytime at the location of the terminal, the terminal determines, by using weather information at the location of the terminal, whether it is sunny or not (such as cloudy, rainy, or snowy) at the location of the terminal. When it is nighttime at the location of the terminal, the adjustment factor corresponding to each component value of the display screen in the RGB color space may be obtained from the preset lookup table by using the ambient light $Y_{am}$ as a lookup factor. When it is daytime at the location of the terminal and it is sunny at the location of the terminal, $\alpha=1$, $\beta=1$, and $\gamma=1$. In this embodiment of the present invention, $\alpha \in [0,1]$, $\beta \in [0,1]$, and $\gamma \in [0,1]$.

It should be noted that, $\alpha$, $\beta$, and $\gamma$ in this embodiment of the present invention cannot be 0 simultaneously.

It should be noted that, in this embodiment of the present invention, step S1045 may be performed before step S1044 is performed. To be specific, after step S1043 is performed, step S1045 is performed to calibrate each component value corresponding to the display screen in the RGB color space, and then step S1044 is performed, to perform normalization processing on the calibrated component value of each component value corresponding to the display screen in the RGB color space. In this way, accuracy of the second color parameter can be improved.

It may be understood that, when step S1045 is performed before step S1044 is performed, normalization processing is performed on each calibrated component value in step S1044 in this embodiment of the present invention.

For example, normalization processing is performed, by using a formula $$x = \frac{X}{MAX(R_c, G_c, B_c)},$$

on the R component value corresponding to the display screen in the RGB color space, where X is $R_c$, $G_c$, or $B_c$, and x represents a normalized component value of an X component value corresponding to the display screen in the RGB color space.

Specifically, step S105 in this embodiment of the present invention may be implemented in the following manner:

The first color parameter and the second color parameter are integrated according to a formula $$\begin{cases} r_3 = (\rho_1 r_2 + 1 - \rho_1)(\rho_2 r_1 + 1 - \rho_2) \\ g_3 = (\rho_1 g_2 + 1 - \rho_1)(\rho_2 g_1 + 1 - \rho_2) \\ b_3 = (\rho_1 b_2 + 1 - \rho_1)(\rho_2 b_1 + 1 - \rho_2) \end{cases}$$

to determine the third color parameter, where $\rho_1$ represents a first integration factor, $\rho_2$ represents a second integration factor, $r_3$ represents an R color component value in the third color parameter, $g_3$ represents a G color component value in the third color parameter, $b_3$ represents a B color component value in the third color parameter, r represents an R color component value in the first color parameter, $g_1$ represents a G color component value in the first color parameter, $b_1$ represents a B color component in the first color parameter, $r_2$ represents an R color component value in the second color parameter, $g_2$ represents a G color component value in the second color parameter, and $b_2$ represents a B color component value in the second color parameter.

For example, a value of the first integration factor $\rho_2$ is from 0 to 1, and a value of the second integration factor $\rho_2$ is from 0 to 1.

The foregoing mainly describes the solutions provided in the embodiments of the present invention from a perspective of interaction between network elements. It may be understood that, to implement the foregoing functions, each network element such as the terminal includes a corresponding hardware structure and/or software module for performing each function. Persons skilled in the art should be easily aware that, with reference to units and algorithm steps in the examples described in the embodiments disclosed in this specification, the present invention can be implemented in a form of hardware or a combination of hardware and computer software. Whether a function is performed by hardware or computer software driving hardware depends on particular applications and design constraint conditions of the technical solutions. Persons skilled in the art may use different methods to implement the described functions for each particular application, but it should not be considered that the implementation goes beyond the scope of the present invention.

In the embodiments of the present invention, the terminal and the like may be divided into function modules based on the foregoing method examples. For example, each function module may be obtained through division for a corresponding function, or two or more functions may be integrated into one processing module. The integrated module may be implemented in a form of hardware, or may be implemented in a form of a software function module. It should be noted that, the module division in the embodiments of the present invention is an example, and is only logical function division. There may be another division manner in actual implementation.

Figure 12A:
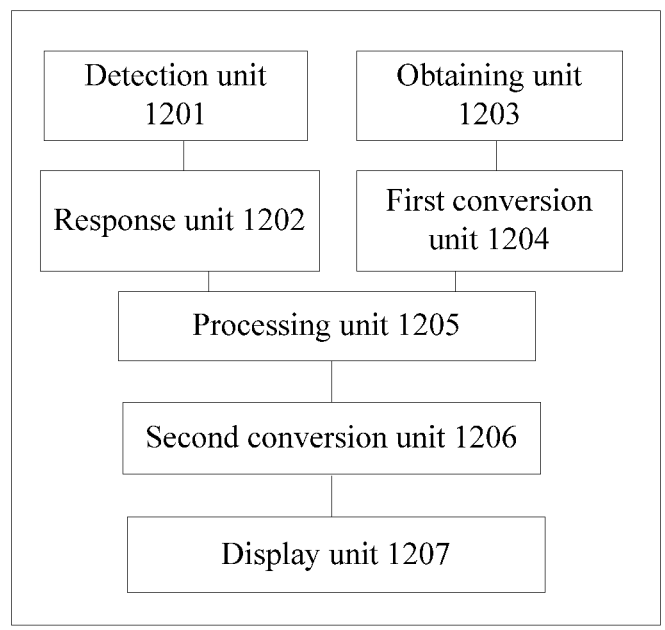
FIG. 12A is a first schematic structural diagram of a terminal according to an embodiment of the present invention.

When each function module is obtained through division for a corresponding function, FIG. 12A is a schematic diagram of a possible structure of the terminal in the foregoing embodiment. The terminal includes a detection unit 1201, a response unit 1202, an obtaining unit 1203, a first conversion unit 1204, a processing unit 1205, a second conversion unit 1206, and a display unit 1207. The detection unit 1201 is configured to support the terminal in performing a process S101 in FIG. 4. The response unit is configured to support the terminal in performing a process S102 in FIG. 4. The obtaining unit 1203 is configured to support the terminal in performing a process S103 in FIG. 4. The first conversion unit 1204 is configured to support the terminal in performing S104 in FIG. 4. The processing unit 1205 is configured to support the terminal in performing S105 in FIG. 4. The second conversion unit 1206 is configured to support the terminal in performing S106 in FIG. 4. The display unit is configured to support the terminal in performing a process S107 in FIG. 4. All related content of each step in the foregoing method embodiment may be cited in function descriptions of a corresponding function module, and details are not described herein.

Figure 12B:
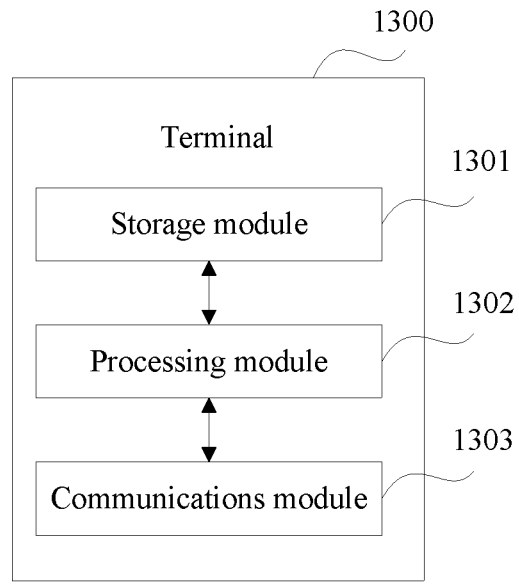
FIG. 12B is a second schematic structural diagram of a terminal according to an embodiment of the present invention.

When an integrated unit is used, FIG. 12B is a schematic diagram of a possible structure of the terminal in the foregoing embodiment. A terminal 1300 includes a processing module 1302 and a communications module 1303. The processing module 1302 is configured to perform control and management on an action of the terminal. For example, the processing module 1302 is configured to support the terminal in performing processes S102, S104, S105, S106, and S107 in FIG. 4, and processes S1021, S1022, and S1023 in FIG. 9. The communications module 1303 is configured to support the terminal in communicating with another network entity. The terminal may further include a storage module 1301, configured to store program code and data that are of a base station.

The processing module 1302 may be a processor or a controller, for example, may be a central processing unit (Central Processing Unit, CPU), a general purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The processing module may implement or execute various example logic blocks, modules, and circuits that are described with reference to content disclosed in the present invention. Alternatively, the processor may be a combination that implements a computation function, for example, a combination that includes one or more microprocessors, or a combination of a DSP and a microprocessor. The communications module 1303 may be a transceiver, a transceiver circuit, a communications interface, or the like. The storage module 1301 may be a memory.

Figure 12C:
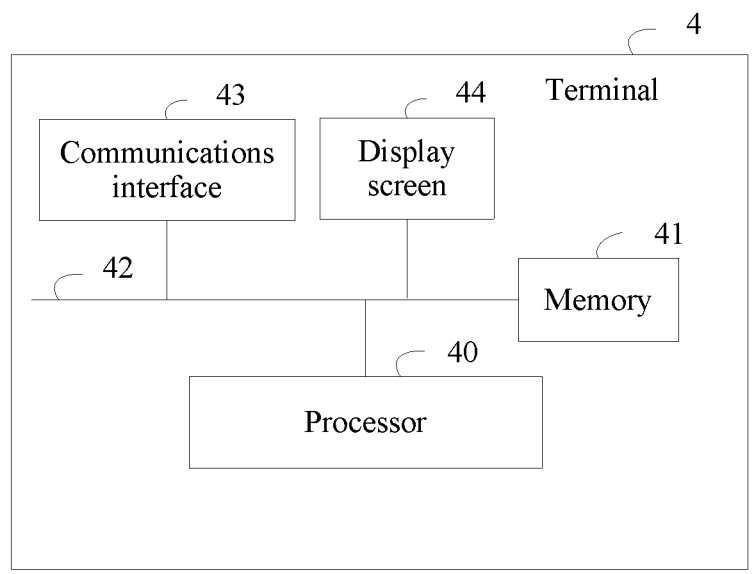
FIG. 12C is a schematic diagram of a hardware structure of a terminal according to an embodiment of the present invention.

When the processing module 1302 is a processor, the communications module 1303 is a transceiver, and the storage module 1301 is a memory, the base station in this embodiment of the present invention may be a terminal shown in FIG. 12C.

Figure 13A:
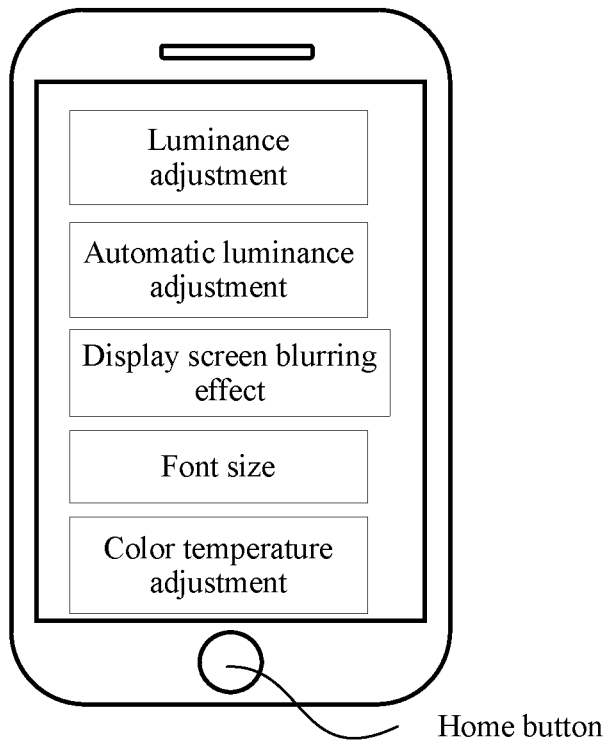
FIG. 13A is a first schematic structural diagram of a graphical user interface according to an embodiment of the present invention.
Figure 13B:
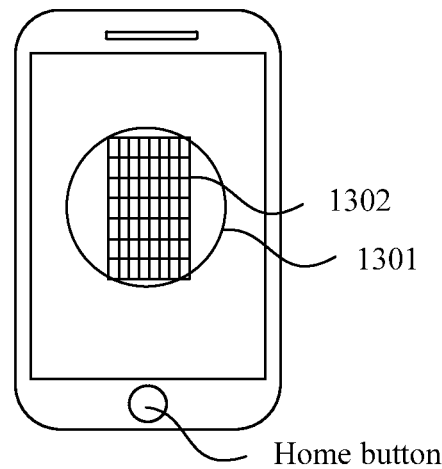
FIG. 13B is a second schematic structural diagram of a graphical user interface according to an embodiment of the present invention.
Figure 13C:
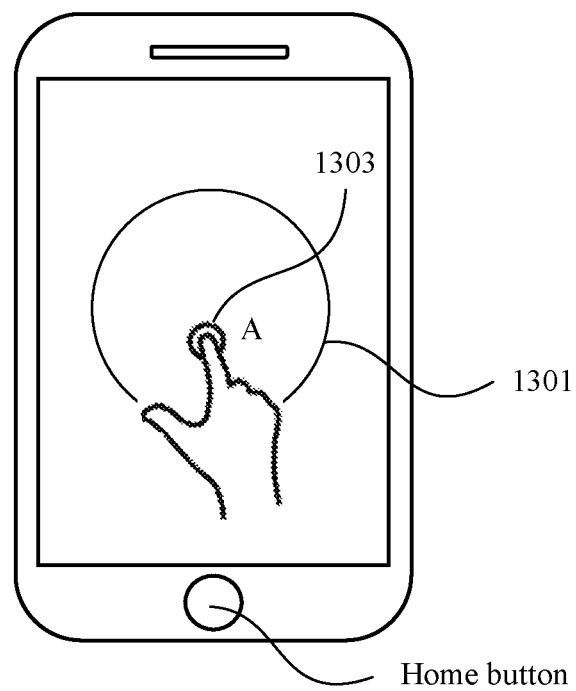
FIG. 13C is a third schematic structural diagram of a graphical user interface according to an embodiment of the present invention.

As shown in FIG. 13C, a terminal 4 includes a processor 40, a communications interface 43, a memory 41, and a display screen 44. The memory 41 is configured to store a computer execution instruction. The processor 40 is connected to the memory 41 by using a system bus 42. When the terminal runs, the processor 40 executes the computer execution instruction stored in the memory 41, so that the terminal performs processes S102, S104, S105, and S106 that are shown in FIG. 4. The display screen 44 is configured to support the terminal in performing a process S101 and a process S107 that are shown in FIG. 4, and/or is configured to perform other technical processes described in this specification.

The communications interface 43 may be a transceiver, a transceiver circuit, or a communications interface. For example, the communications interface 43 of the terminal may be specifically a transceiver of the terminal. The transceiver may be a wireless transceiver. For example, the wireless transceiver may be an antenna or the like of the terminal. The processor 40 receives data from or sends data to another device such as a base station by using the communications interface 43. The terminal may further include the memory 41, configured to store program code and data that are of the base station.

The memory 41 may include a volatile memory (English: volatile memory), for example, a random access memory (English: random-access memory, RAM for short). Alternatively, the memory 41 may include a non-volatile memory (English: non-volatile memory), for example, a read-only memory (English: read-only memory, ROM for short), a flash memory (English: flash memory), a hard disk drive (English: hard disk drive, HDD for short), or a solid state drive (English: solid state disk, SSD for short). Alternatively, the memory 41 may include a combination of the foregoing types of memories.

The system bus 42 may include a data bus, a power bus, a control bus, a signal status bus, and the like. For clarity of description in this embodiment, various buses are marked as the system bus 42 in FIG. 12B.

The processor 40 may be a processor or a controller, for example, may be a central processing unit (Central Processing Unit, CPU), a general purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The processor may implement or execute various example logic blocks, modules, and circuits that are described with reference to content disclosed in the present invention. Alternatively, the processor may be a combination that implements a computation function, for example, a combination that includes one or more microprocessors, or a combination of a DSP and a microprocessor.

The processor 40 may be a dedicated processor, and the dedicated processor may include at least one of a baseband processing chip, a radio frequency processing chip, or the like. Further, the dedicated processor may include a chip that has another dedicated processing function of user equipment.

An embodiment of the present invention provides a graphical user interface (graphical user interface, GUI) on a terminal that has a touchscreen. The terminal includes a display, a touchscreen, an ambient light sensor, a memory, and one or more processors configured to execute one or more programs stored in the memory. The graphical user interface includes a display interface and a color temperature adjustment region. In response to detected triggering performed by a user on the touchscreen of the terminal, the display interface is displayed.

In addition, in response to detected triggering performed by the user on a to-be-selected option in the display interface by touching the touchscreen, the color temperature adjustment region is displayed. Each operation point in the color temperature adjustment region is used to display one color, different operation points are used to display different colors, and one color is corresponding to one color temperature.

It should be noted that, the display interface may be an interface from which the user adjusts, by using a home button (home button), a power button, or another touch shortcut key, switching to an interface for adjusting a color temperature of the terminal.

Optionally, the graphical user interface further includes an adjustment control.

In response to a detected touch operation performed by the user on the touchscreen, the adjustment control is displayed. The adjustment control is used to indicate a location of an operation point that is of the touch operation and that is in the color temperature adjustment region, when the touchscreen is triggered.

Optionally, when the touch operation is in the color temperature adjustment region, the adjustment control is displayed at coordinates of a touch point generated during the touch operation; or when the touch operation is outside the color temperature adjustment region, the adjustment control is displayed at coordinates of a target operation point in the color temperature adjustment region, where the target operation point is an operation point that is in the color temperature adjustment region and that is closest to the touch point.

It should be noted that, the terminal in this embodiment may be a smart terminal. For example, the smart terminal may be the smartphone in the embodiment shown in FIG. 3. The display of the terminal may be the display screen 173 in the mobile phone shown in FIG. 3. The touchscreen of the terminal may be the touch panel 142 in the mobile phone shown in FIG. 3. Both the memory and the processor of the terminal may be the memory 120 and the processor 180 in the mobile phone shown in FIG. 3.

The following uses FIG. 13A to FIG. 13D as examples to describe the graphical user interface provided in this embodiment of the present invention. That the terminal in this embodiment is a smartphone is used as an example for description in FIG. 13A.

Figure 13D:
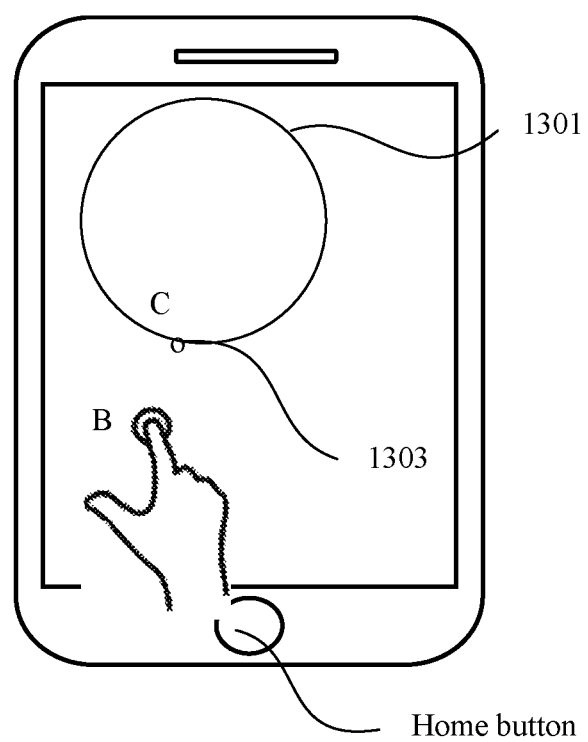
FIG. 13D is a fourth schematic structural diagram of a graphical user interface according to an embodiment of the present invention.

FIG. 13A shows a display interface of the smartphone. The display interface includes a plurality of function options, and the function options are used to indicate different settings for the terminal. Certainly, each function option further includes one or more sub-options. For example, the plurality of function options may include luminance adjustment, automatic luminance adjustment, a display screen blurring effect, a font size, color temperature adjustment, and the like. When a user touches the color temperature adjustment function option, the display interface of the terminal displays a color temperature adjustment region. In addition, when the user touches a touchscreen of the terminal, as shown in FIG. 13B (only some operation points are drawn in the figure, the entire color temperature adjustment region may include operation points in actual use, and one operation point is used to display one color), the smart terminal detects triggering performed by the user on the touchscreen of the smart terminal. In addition, in response to the triggering, the smart terminal displays the display interface on a display of the smart terminal. Then, in response to selection of a to-be-selected option in the display interface when the user touches the touchscreen, the smart terminal displays a color temperature adjustment region 1301 in the display interface. Each operation point 1302 in a first closed curve 101 of the color temperature adjustment region 1301 is used to display one color, different operation points are used to display different colors, and one color is corresponding to one color temperature. When a touch point generated during an input operation of the user is in the color temperature adjustment region 1301, as shown in FIG. 13C (not colors corresponding to all the operation points are shown in the figure), the terminal detects that an input operation A of the user is in the color temperature adjustment region, and in response to the input operation A, displays an adjustment control 1303 in the color temperature adjustment region. A location of the adjustment control 1303 is at the touch point generated during the input operation. When a touch point generated during an input operation of the user is outside the color temperature adjustment region, as shown in FIG. 13D (not colors corresponding to all the operation points are shown in the figure), the terminal detects that an input operation B of the user is outside the color temperature adjustment region 1301, and in response to the input operation B, displays an adjustment control 1303 at a target operation point C on the first closed curve enclosing the color temperature adjustment region. The target operation point C is an operation point that is in the color temperature adjustment region and that is closest to the touch point.

Figure 13E:
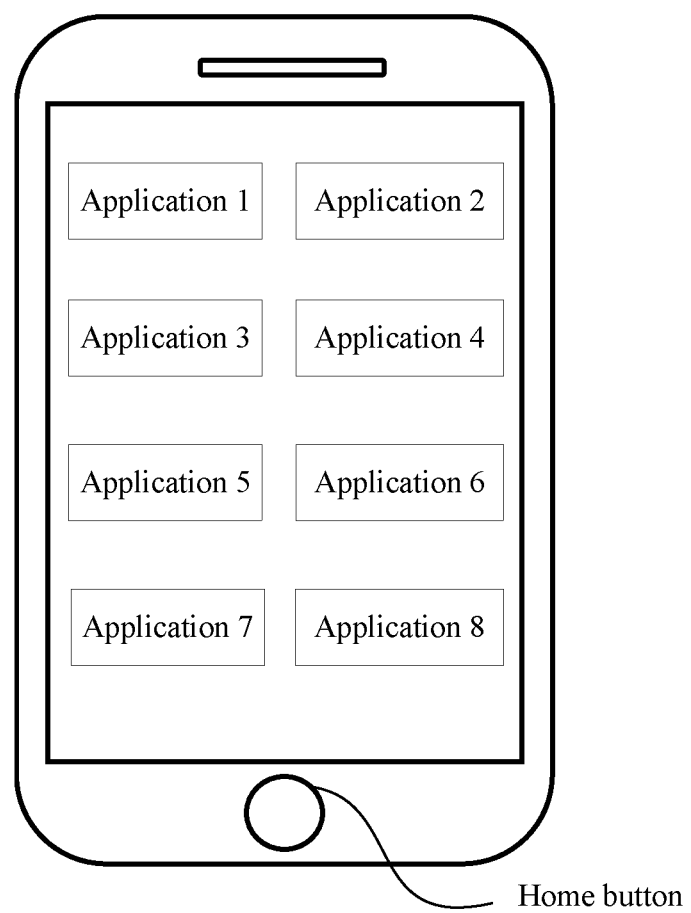
FIG. 13E is a fifth schematic structural diagram of a graphical user interface according to an embodiment of the present invention.

It should be noted that, in FIG. 13A to FIG. 13D, after the user triggers the touchscreen of the terminal or completes, by using an option in an operation menu, corresponding processing on content included in a selected region, the user may first press a "home" button (namely, a home button) to return to a home screen of the smart terminal, for example, an interface shown in the foregoing FIG. 13E.

Further, in this embodiment of the present invention, after the user touches the touchscreen of the smart terminal and the color temperature adjustment region is displayed, the adjustment control may be displayed or may not be displayed in the color temperature adjustment region of the display of the smart terminal, or the adjustment control is displayed in the color temperature adjustment region after an input operation of the user is detected.

According to a graphical user interface provided in this embodiment of the present invention, when the user touches the touchscreen of the smart terminal, an intuitive color temperature adjustment region for displaying different colors may be displayed in the display interface of the smart terminal, an intuitive optional interface is provided for the user, and the user may perform color temperature adjustment on the display screen of the terminal by selecting a color in the color temperature adjustment region. In this way, in different ambient light conditions, the terminal can effectively compensate for a color temperature difference of the display screen based on the input operation and the ambient light, so that a finally adjusted color temperature of the display screen does not show a difference, and the color temperature of the display screen of the terminal matches a chromatic adaptation characteristic of human vision in different ambient light conditions. In addition to this, digital visual fatigue is reduced and sleep is improved.

An embodiment of the present invention further provides a readable medium. The readable medium stores one or more programs, and the one or more programs include a computer execution instruction. When at least one processor of a smart terminal executes the computer execution instruction, the smart terminal executes the color temperature adjustment method shown in S102, S104, and S105 in FIG. 4. For details about the color temperature adjustment method, refer to related descriptions in the embodiment shown in FIG. 4, and details are not described herein again.

Method or algorithm steps described in combination with the content disclosed in the present invention may be implemented by hardware, or may be implemented by a processor by executing a software instruction. The software instruction may include a corresponding software module. The software module may be stored in a random access memory (Random Access Memory, RAM), a flash memory, a read-only memory (Read-Only Memory, ROM), an erasable programmable read only memory (Erasable Programmable ROM, EPROM), an electrically erasable programmable read only memory (Electrically EPROM, EEPROM), a register, a hard disk, a removable hard disk, a compact disc read-only memory (CD-ROM), or a storage medium in any other form well-known in the art. For example, the storage medium is coupled to the processor, so that the processor can read information from the storage medium or write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

It may be clearly understood by persons skilled in the art that, for the purpose of convenient and brief description, division of the foregoing function modules is taken as an example for illustration. In actual application, the foregoing functions can be allocated to different function modules and implemented according to a requirement, to be specific, an inner structure of an apparatus is divided into different function modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is only an example. For example, the module or unit division is only logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, function units in the embodiments of the present invention may be integrated into one processing unit, or each of the units may exist alone physically, or two or more units are integrated into one unit. The integrated unit may be implemented in a form of a software function unit.

When the integrated unit is implemented in the form of a software function unit and sold or used as an independent product, the integrated unit may be stored in a computer-readable storage medium. Based on such an understanding, all or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the present invention. The storage medium is a non-transitory (English: non-transitory) medium, and includes any medium that can store program code, such as a flash memory, a removable hard disk, a read-only memory, a random access memory, a magnetic disk, or an optical disc.

Finally, it should be noted that the foregoing embodiments are only intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention. Therefore, the protection scope of the present invention is subject to the appended claims.

What is claimed is:

1. A color temperature adjustment method implemented by a terminal, wherein the terminal comprises a display screen, wherein the display screen comprises a color temperature adjustment region, and wherein the color temperature adjustment method comprises:
displaying the color temperature adjustment region on the display screen, wherein each operation point in the color temperature adjustment region displays one color, wherein different operation points display different colors, and wherein one color corresponds to one color temperature;
detecting an input operation performed on the display screen when the display screen is touched, wherein a touch point generated during the input operation corresponds to an operation point in the color temperature adjustment region;
converting coordinates of the operation point corresponding to the input operation into a first color parameter;
obtaining ambient light using an ambient light sensor;
converting a color parameter of the ambient light into a second color parameter by:
obtaining component values corresponding to the color parameter of the ambient light in XYZ color space;
determining a first component value and a second component value of the display screen in the XYZ color space based on a current luminance of the display screen and the component values corresponding to the color parameter of the ambient light in the XYZ color space;
determining, based on the first component value, the current luminance of the display screen, and the second component value, each component value corresponding to the display screen in RGB color space; and
performing color temperature adjustment normalization processing on each component value corresponding to the display screen in the RGB color space to obtain the second color parameter;
integrating the first color parameter and the second color parameter to obtain a third color parameter;
converting the third color parameter into a target color parameter, wherein each component value in the target color parameter matches red green blue (RGB) channels of the terminal corresponding to each component value; and
displaying the target color parameter on the display screen of the terminal.

2. The color temperature adjustment method of claim 1, wherein determining the first component value and the second component value of the display screen in the XYZ color space comprises:
determining the first component value of the display screen in the XYZ color space according to a formula $$X_{sc} = \frac{X_{am}}{Y_{am}} Y_{sc},$$

wherein $X_{sc}$ represents the first component value of the display screen in the XYZ color space, wherein $X_{am}$ represents an X component value corresponding to the color parameter of the ambient light in the XYZ color space, wherein $Y_{am}$ represents a Y component value corresponding to the color parameter of the ambient light in the XYZ color space, and wherein $Y_{sc}$ represents the current luminance of the display screen; and
determining the second component value of the display screen in the XYZ color space according to a formula $$Z_{sc} = \frac{Z_{am}}{Y_{am}} Y_{sc},$$

wherein $Z_{sc}$ represents a Z component value of the display screen in the XYZ color space, and wherein $Z_{am}$ represents a Z component value corresponding to the color parameter of the ambient light in the XYZ color space.

3. The color temperature adjustment method of claim 1, wherein before determining the first component value and the second component value of the display screen in the XYZ color space, the color temperature adjustment method further comprises:

obtaining a current luminance level of the display screen; and converting the current luminance level into the current luminance of the display screen based on a maximum luminance level of the display screen of the terminal and a maximum luminance of the display screen.

4. The color temperature adjustment method of claim 1, wherein before performing the color temperature adjustment normalization processing, the color temperature adjustment method further comprises calibrating, based on each component value corresponding to the display screen in the RGB color space and a preset adjustment factor of the component value, each component value corresponding to the display screen in the RGB color space to obtain a calibrated component value of each component value corresponding to the display screen in the RGB color space.

5. The color temperature adjustment method of claim 4, wherein before calibrating each component value corresponding to the display screen in the RGB color space, the color temperature adjustment method further comprises determining, from a preset lookup table, and based on ambient information and a Y component value of the color parameter of the ambient light in the XYZ color space, the preset adjustment factor of each component value corresponding to the display screen in the RGB color space, wherein the preset lookup table comprises a correspondence between the Y component value and each component value corresponding to the display screen in the RGB color space, and wherein the ambient information comprises weather condition information, sunrise time information, and sunset time information.

6. The color temperature adjustment method of claim 1, wherein performing the color temperature adjustment normalization processing comprises:

obtaining a maximum component value from component values corresponding to the display screen in the RGB color space;

determining, as a normalized component value of each component value corresponding to the display screen in the RGB color space, a result obtained by dividing each component value corresponding to the display screen in the RGB color space by the maximum component value; and determining, as the second color parameter, the normalized component value of each component value corresponding to the display screen in the RGB color space.

7. A color temperature adjustment method implemented by a terminal, wherein the terminal comprises a display screen, wherein the display screen comprises a color temperature adjustment region, and wherein the color temperature adjustment method comprises:

displaying the color temperature adjustment region on the display screen, wherein each operation point in the color temperature adjustment region displays one color, wherein different operation points display different colors, and wherein one color corresponds to one color temperature;

detecting an input operation performed on the display screen when the display screen is touched, wherein a touch point generated during the input operation corresponds to an operation point in the color temperature adjustment region;

converting coordinates of the operation point corresponding to the input operation into a first color parameter, wherein at least one control point is provided in the color temperature adjustment region, wherein one control point corresponds to one RGB parameter, and wherein converting the coordinates of the operation point into the first color parameter comprises:

determining, based on a relationship between coordinates of the touch point generated during the input operation and the color temperature adjustment region, polar coordinates of the operation point in the color temperature adjustment region;

determining, based on a location of the polar coordinates of the operation point in the color temperature adjustment region, N control points corresponding to the input operation; and converting the polar coordinates of the operation point into the first color parameter based on RGB parameters of the N control points corresponding to the input operation using a gain interpolation algorithm;

obtaining ambient light using an ambient light sensor;

converting a color parameter of the ambient light into a second color parameter;

integrating the first color parameter and the second color parameter to obtain a third color parameter;

converting the third color parameter into a target color parameter, wherein each component value in the target color parameter matches red green blue (RGB) channels of the terminal corresponding to each component value; and displaying the target color parameter on the display screen of the terminal.

8. The color temperature adjustment method of claim 7, wherein the polar coordinates of the operation point are the same as polar coordinates of any control point in the color temperature adjustment region, and wherein converting the polar coordinates of the operation point into the first color parameter comprises determining, as the first color parameter, an RGB parameter of the control point that has the same polar coordinates as the operation point.

9. The color temperature adjustment method of claim 7, wherein N≥two, wherein a closed region enclosed by a closed curve comprising the N control points comprises the polar coordinates of the operation point, and wherein converting the polar coordinates of the operation point into the first color parameter comprises:

obtaining a component value corresponding to at least one first intersection point in target color space when the polar coordinates of the operation point are different from polar coordinates of any one of the N control points, wherein the at least one first intersection point is a point at which the closed curve comprising the N control points is intersected with a line connecting a center of the color temperature adjustment region and the operation point of the input operation in the color temperature adjustment region;

determining, based on the component value corresponding to the at least one first intersection point in the target color space, a component value corresponding to the polar coordinates of the operation point in the target color space;

converting, in RGB color space, the component value corresponding to the polar coordinates of the operation point in the target color space to obtain a component value of the polar coordinates of the operation point in the RGB color space; and determining, as a first RGB adjustment parameter, the component value of the polar coordinates of the operation point in the RGB color space.

10. The color temperature adjustment method of claim 9, wherein obtaining the component value corresponding to the at least one first intersection point in the target color space comprises obtaining, according to a formula $$Y = [C_1, \ldots, C_N] \begin{bmatrix} \frac{\varphi_2}{\varphi_1 + \varphi_2} \\ \frac{\varphi_1}{\varphi_1 + \varphi_2} \end{bmatrix},$$

a component value corresponding to a first-first intersection point in the target color space, wherein Y represents the component value corresponding to the first-first intersection point in the target color space, wherein $C_1$ represents a component value corresponding to a first control point in the target color space, wherein the first control point is in the color temperature adjustment region and corresponds to the first-first intersection point, wherein $C_N$ represents a component value corresponding to an $N^{th}$ control point in the target color space, wherein the $N^{th}$ control point is in the color temperature adjustment region and corresponds to the first-first intersection point, wherein $\varphi_1$ represents polar coordinates of a first included angle formed by the first-first intersection point, the center of the color temperature adjustment region, and the first control point corresponding to the first-first intersection point, wherein $\varphi_2$ represents polar coordinates of a second included angle formed by the first-first intersection point, the center of the color temperature adjustment region, and a second control point corresponding to the first intersection point, and wherein the first control point and the second control point are end points in a sub-region to which the first-first intersection point belongs.

11. The color temperature adjustment method of claim 9, wherein determining the component value corresponding to the polar coordinates of the operation point in the target color space comprises determining, using a formula $$R = [S_1, T_1] \begin{bmatrix} \frac{u}{u+v} \\ \frac{v}{u+v} \end{bmatrix},$$

the component value corresponding to the polar coordinates of the operation point in the target color space, wherein u=rho$_T$−rho, wherein v=rho−rho$_S$, wherein $T_1$ represents a component value corresponding to a first-first intersection point in the target color space (T), wherein $S_1$ represents a component value corresponding to a second-first intersection point in the target color space (S), wherein rho$_T$ represents a radius of polar coordinates of the T, wherein rho represents a radius of the polar coordinates of the operation point, and wherein rho$_S$ represents a radius of polar coordinates of the S.

12. The color temperature adjustment method of claim 7, wherein determining the polar coordinates of the operation point in the color temperature adjustment region comprises converting, into polar coordinates, the coordinates of the touch point generated during the input operation when the touch point generated during the input operation is in the color temperature adjustment region.

13. The color temperature adjustment method of claim 7, wherein integrating the first color parameter and the second color parameter to obtain the third color parameter comprises integrating the first color parameter and the second color parameter according to a formula $$\begin{cases} r_3 = (\rho_1 r_2 + 1 - \rho_1)(\rho_2 r_1 + 1 - \rho_2) \\ g_3 = (\rho_1 g_2 + 1 - \rho_1)(\rho_2 g_1 + 1 - \rho_2), \\ b_3 = (\rho_1 b_2 + 1 - \rho_1)(\rho_2 b_1 + 1 - \rho_2) \end{cases}$$

to determine the third color parameter, wherein $\rho_1$ represents a first integration factor, wherein $\rho_2$ represents a second integration factor, wherein $r_3$ represents an R color component value in the third color parameter, wherein $g_3$ represents a G color component value in the third color parameter, wherein represents a B color component value in the third color parameter, wherein $r_1$ represents an R color component value in the first color parameter, wherein $g_1$ represents a G color component value in the first color parameter, wherein $b_1$ represents a B color component in the first color parameter, wherein $r_2$ represents an R color component value in the second color parameter, wherein $g_2$ represents a G color component value in the second color parameter, and wherein $b_2$ represents a B color component value in the second color parameter.

14. The color temperature adjustment method of claim 7, wherein determining the polar coordinates of the operation point in the color temperature adjustment region comprises:
  obtaining a target operation point of the input operation in the color temperature adjustment region when the touch point generated during the input operation is outside the color temperature adjustment region, wherein the target operation point is an operation point in the color temperature adjustment region proximate to the touch point;
  converting coordinates of the target operation point into polar coordinates; and
  determining polar coordinates of the target operation point as the polar coordinates of the operation point in the color temperature adjustment region.

15. A terminal comprising:
  a memory comprising instructions; and
  a computer processor coupled to the memory and configured to execute the instructions to:
    display a color temperature adjustment region on a display screen, wherein each operation point in the color temperature adjustment region displays one color, wherein different operation points display different colors, and wherein one color corresponds to one color temperature;
    detect an input operation performed on the display screen when the display screen is touched, wherein a touch point generated during the input operation corresponds to an operation point in the color temperature adjustment region;
    convert coordinates of the operation point corresponding to the input operation into a first color parameter;
    obtain ambient light using an ambient light sensor;
    convert a color parameter of the ambient light into a second color parameter by:
      obtaining component values corresponding to the color parameter of the ambient light in XYZ color space;
      determining a first component value and a second component value of the display screen in the XYZ color space based on a current luminance of the display screen and the component values corresponding to the color parameter of the ambient light in the XYZ color space;

determining, based on the first component value, the current luminance of the display screen, and the second component value, each component value corresponding to the display screen in RGB color space; and performing color temperature adjustment normalization processing on each component value corresponding to the display screen in the RGB color space to obtain the second color parameter;

integrate the first color parameter and the second color parameter to obtain a third color parameter;

convert the third color parameter into a target color parameter, wherein each component value in the target color parameter matches red green blue (RGB) channels of the terminal corresponding to each component value; and display the target color parameter on the display screen of the terminal.

16. The terminal of claim 15, wherein the computer processor is configured to determine the first component value and the second component value of the display screen in the XYZ color space by:

determining the first component value of the display screen in the XYZ color space according to a formula $$X_{sc} = \frac{X_{am}}{Y_{am}} Y_{sc},$$

wherein $X_{sc}$ represents the first component value of the display screen in the XYZ color space, wherein $X_{am}$ represents an X component value corresponding to the color parameter of the ambient light in the XYZ color space, wherein $Y_{am}$ represents a Y component value corresponding to the color parameter of the ambient light in the XYZ color space, and wherein $Y_{sc}$ represents the current luminance of the display screen; and determining the second component value of the display screen in the XYZ color space according to a formula $$Z_{sc} = \frac{Z_{am}}{Y_{am}} Y_{sc},$$

wherein $Z_{sc}$ represents a Z component value of the display screen in the XYZ color space, and wherein am represents a Z component value corresponding to the color parameter of the ambient light in the XYZ color space.

17. The terminal of claim 15, wherein before determining the first component value and the second component value of the display screen in the XYZ color space, the computer processor is further configured to execute the instructions to:

obtain a current luminance level of the display screen; and convert the current luminance level into the current luminance of the display screen based on a maximum luminance level of the display screen of the terminal and a maximum luminance of the display screen.

18. The terminal of claim 15, wherein before performing the color temperature adjustment normalization processing, the computer processor is further configured to execute the instructions to calibrate, based on each component value corresponding to the display screen in the RGB color space and a preset adjustment factor of the component value, each component value corresponding to the display screen in the RGB color space to obtain a calibrated component value of each component value corresponding to the display screen in the RGB color space.

19. The terminal of claim 18, wherein before calibrating each component value corresponding to the display screen in the RGB color space, the computer processor is further configured to execute the instructions to determine, from a preset lookup table, and based on ambient information and a Y component value of the color parameter of the ambient light in the XYZ color space, the preset adjustment factor of each component value corresponding to the display screen in the RGB color space, wherein the preset lookup table comprises a correspondence between the Y component value and each component value corresponding to the display screen in the RGB color space, and wherein the ambient information comprises weather condition information, sunrise time information, and sunset time information.

20. The terminal of claim 15, wherein the computer processor is configured to perform the color temperature adjustment normalization processing by:

obtaining a maximum component value from component values corresponding to the display screen in the RGB color space;

determining, as a normalized component value of each component value corresponding to the display screen in the RGB color space, a result obtained by dividing each component value corresponding to the display screen in the RGB color space by the maximum component value; and determining, as the second color parameter, the normalized component value of each component value corresponding to the display screen in the RGB color space.

21. The terminal of claim 15, wherein the computer processor is further configured to execute the instructions to provide an adjustment control in the color temperature adjustment region, wherein a location of the adjustment control varies, in the color temperature adjustment region, with the input operation, and wherein the adjustment control indicates a color selected, during the input operation, in the color temperature adjustment region.

* * * * *

UNITED STATES PATENT AND TRADEMARK OFFICE
CERTIFICATE OF CORRECTION

PATENT NO. : 10,872,583 B2
APPLICATION NO. : 16/345978
DATED : December 22, 2020
INVENTOR(S) : Shitong Wang et al.

Page 1 of 1

It is certified that error appears in the above-identified patent and that said Letters Patent is hereby corrected as shown below:

On the Title Page

Page 2, References Cited, Other Publications: "https://club.nuawei.com/" should read "https://club.huawei.com/"

In the Claims

Claim 13, Column 46, Line 15: "wherein represents a B" should read "wherein $b_3$ represents a B"

Claim 16, Column 47, Line 49: "wherein am represents" should read "wherein $Z_{am}$ represents"

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*